US012769973B2

(12) United States Patent
Yang et al.

(10) Patent No.: US 12,769,973 B2
(45) Date of Patent: Oct. 20, 2026

(54) ACQUIRING APPARATUS AND CONTROL METHOD THEREFOR, AND CONTROL APPARATUS

(71) Applicant: Advanced Nova Technologies (Singapore) Holding Pte. Ltd., Singapore (SG)

(72) Inventors: Jing Yang, Hangzhou (CN); Ting Wang, Hangzhou (CN); Liqiang Gao, Hangzhou (CN); Zhaoyi Zhang, Hangzhou (CN); Yang Shen, Hangzhou (CN); Chenghan Ai, Hangzhou (CN); Weijun Zheng, Hangzhou (CN); Qing Wang, Hangzhou (CN)

(73) Assignee: Advanced Nova Technologies (Singapore) Holding PTE. LTD., Singapore (SG)

( * ) Notice: Subject to any disclaimer, the term of this patent is extended or adjusted under 35 U.S.C. 154(b) by 0 days.

(21) Appl. No.: 19/271,279

(22) Filed: Jul. 16, 2025

(65) Prior Publication Data

US 2026/0023947 A1 Jan. 22, 2026

(30) Foreign Application Priority Data

Jul. 17, 2024 (CN) ......................... 202410957665.5
Jan. 10, 2025 (SG) ........................... 10202500089V

(51) Int. Cl.
*G06K 19/07* (2006.01)

(52) U.S. Cl.
CPC ................................ *G06K 19/0723* (2013.01)

(58) Field of Classification Search
CPC .................................................. G06K 19/0723
(Continued)

(56) References Cited

U.S. PATENT DOCUMENTS 8,880,028 B2 * 11/2014 Han .................. H04M 1/72412 455/411
10,318,952 B1 6/2019 Wade et al.
(Continued)

FOREIGN PATENT DOCUMENTS

CN 104253634 A 12/2014
CN 104880201 A 9/2015
(Continued)

OTHER PUBLICATIONS

International Search Report and Written Opinion in International Appln. No. PCT/CN2024/128216, mailed on Mar. 27, 2025, 10 pages (with partial English translation).
(Continued)

*Primary Examiner* — Ahshik Kim
(74) *Attorney, Agent, or Firm* — Fish & Richardson P.C.

(57) ABSTRACT

Embodiments of this specification provide acquiring apparatuses, methods, and computer program product. An acquiring apparatus includes a controller, a first near field communication (NFC) module, and a second NFC module. The first NFC module and the second NFC module work under control of the controller. The first NFC module is configured to work in a card reader mode, and in the card reader mode, the first NFC module is configured to transmit a first radio frequency signal, detect first response information, and obtain customer information based on the first response information. The second NFC module is configured to work in a card emulation mode, and in the card emulation mode, the second NFC module is configured to send second response information comprising merchant acquiring information in response to sensing a second radio frequency signal.

30 Claims, 13 Drawing Sheets

(58) Field of Classification Search
USPC .......................................................... 235/492
See application file for complete search history.

(56) References Cited

U.S. PATENT DOCUMENTS

| | | | |
|---|---|---|---|
| 2011/0250839 A1 | 10/2011 | Lee et al. | |
| 2012/0322371 A1 | 12/2012 | Lee et al. | |
| 2013/0237153 A1 | 9/2013 | Ryu et al. | |
| 2014/0256251 A1 | 9/2014 | Caceres et al. | |
| 2015/0126111 A1* | 5/2015 | Socol | G06K 19/0725 455/41.1 |
| 2015/0339659 A1 | 11/2015 | Ballesteros | |
| 2022/0036017 A1* | 2/2022 | Li | H04W 4/80 |
| 2022/0318786 A1 | 10/2022 | Pierre et al. | |
| 2024/0356583 A1* | 10/2024 | Tornambe | H04B 5/22 |
| 2025/0111176 A1* | 4/2025 | Tramoni | H04B 5/48 |

FOREIGN PATENT DOCUMENTS

| | | |
|---|---|---|
| CN | 110941339 A | 3/2020 |
| CN | 113052591 A | 6/2021 |
| CN | 113988247 A | 1/2022 |
| CN | 117196614 A | 12/2023 |
| CN | 117494746 A | 2/2024 |
| CN | 118504594 A | 8/2024 |
| CN | 119255218 A | 1/2025 |
| CN | 119298947 A | 1/2025 |
| KR | 101381568 B1 | 4/2014 |
| KR | 102372598 B1 | 3/2022 |
| KR | 102615284 B1 | 12/2023 |
| WO | WO 2026016326 A1 | 1/2026 |

OTHER PUBLICATIONS

Roland, “Software Card Emulation in NFC-enabled Mobile Phones: Great Advantage or Security Nightmare?,” Paper, Presented at the Proceedings of the Fourth International Workshop on Security and Privacy in Spontaneous Interaction and Mobile Phone Use (IWSSI/SPMU), Newcastle, UK, Jun. 18, 2012, 6 pages.

Extended European Search Report in European Appln. No. 26151200.8, mailed on Jul. 1, 2026, 9 pages.

* cited by examiner

ACQUIRING APPARATUS AND CONTROL METHOD THEREFOR, AND CONTROL APPARATUS

CROSS-REFERENCE TO RELATED APPLICATIONS

This application claims priority to Singapore Patent Application No. 10202500089V, filed Jan. 10, 2025, which claims the benefit of priority to Chinese Patent Application No. 202410957665.5, filed on Jul. 17, 2024, and each application is hereby incorporated by reference in its entirety.

TECHNICAL FIELD

One or more embodiments of this specification relate to the field of sensing interaction technologies, and in particular, to an acquiring apparatus and a control method therefor, and a control apparatus.

BACKGROUND

Near field communication (NFC) is a short-distance and high-frequency radio technology, which is evolved from non-contact radio frequency identification and interconnection and interworking technologies, and provides a secure and fast communication manner for various electronic products. The NFC technology runs at a 13.56 MHz frequency, and establishes a wireless communication between sensing objects within a distance of 20 cm.

Because of convenience of the NFC technology, the NFC technology is increasingly applied to various life scenarios, for example, scanning a door access card or scanning a subway gate card. In these scenarios, an NFC card reader is disposed to read card information in an physical card or an emulated card, to implement permission control.

Recently, the NFC technology also starts to be applied in a payment scenario. Due to complexity and flexibility of the payment scenario, it is desirable to provide an improved solution, so that an acquiring apparatus is better compatible with and adapted to NFC payment.

SUMMARY

One or more embodiments of this specification describe an acquiring apparatus and a control method therefor, and a control apparatus. The acquiring apparatus can work in different NFC working modes to support different NFC payment manners.

According to a first aspect, this specification provides an acquiring apparatus, including a controller, a first NFC module, and a second NFC module. The first NFC module and the second NFC module work under control of the controller. The first NFC module is configured to work in a card reader mode, and is configured to transmit a first radio frequency signal, detect first response information, and obtain customer payment information based on the first response information. The second NFC module is configured to work in a card emulation mode, and is configured to send second response information including merchant acquiring information in response to sensing a second radio frequency signal.

According to a second aspect, this specification provides a control method for an acquiring apparatus. The acquiring apparatus includes a first NFC module and a second NFC module. The control method includes: enabling, in a first condition, the first NFC module to work in a card reader mode, to transmit a first radio frequency signal, detect first response information, and obtain customer payment information based on the first response information; and enabling, in a second condition, the second NFC module to work in a card emulation mode, to send second response information including merchant acquiring information in response to sensing a second radio frequency signal.

According to a third aspect, this specification provides a control apparatus in an acquiring apparatus. The acquiring apparatus includes a first NFC module and a second NFC module. The control apparatus includes: a first working module, configured to enable, in a first condition, the first NFC module to work in a card reader mode, to transmit a first radio frequency signal, detect first response information, and obtain customer payment information based on the first response information; and a second working module, configured to enable, in a second condition, the second NFC module to work in a card emulation mode, to send second response information including merchant acquiring information in response to sensing a second radio frequency signal.

According to a fourth aspect, this specification provides a computer program product, including a computer program/instructions. The computer program/instructions are executed by a processor to implement the steps of the according to the second aspect.

In conclusion, according to the above-mentioned acquiring apparatus and control method disclosed in embodiments of this specification, an NFC module that supports a card emulation working mode and an NFC module that supports a card reader working mode are deployed the acquiring apparatus side, so that the acquiring apparatus can simultaneously support two NFC payment manners. The NFC modules are selectively started in different scenario conditions, so that the acquiring apparatus can establish communication with a payment tool working in any NFC working mode, so that compatibility of the acquiring apparatus in near field communication is improved, and the acquiring apparatus can be better integrated in a payment scenario.

BRIEF DESCRIPTION OF DRAWINGS

To describe the technical solutions in the embodiments of the present invention more clearly, the following briefly describes the accompanying drawings needed for describing the embodiments. Clearly, the accompanying drawings in the following description show merely some embodiments of the present invention, and a person of ordinary skill in the art can still derive other drawings from these accompanying drawings without creative efforts.

DESCRIPTION OF EMBODIMENTS

The following describes the solutions provided in the embodiments of this specification with reference to the accompanying drawings.

As described above, because of popularity and convenience of the near field communication technology, near field communication is widely used in various service scenarios, to provide convenient and secure interaction manners for a large quantity of customers. This not only improves service interaction efficiency, but also enhances data transmission security, making many operations in daily life simpler and more intelligent.

In a payment scenario, with promotion of the NFC technology, an acquiring apparatus also starts to support the NFC technology. In this specification, the acquiring apparatus refers to an apparatus that is used by a merchant to accept electronic payment of a customer, and includes but is not limited to a point-of-sale (POS) terminal, a card reader, a self-service checkout device, a payment component in a vending machine, and an intelligent terminal that has a function of receiving electronic payment by installing a specific program. The acquiring apparatus is usually implemented by a dedicated hardware device, and has the following internal structure shown in FIG. 1. However, it should be understood that, with iterative update of an intelligent terminal (for example, a smartphone, a smart wearable device, or a portable computer), a hardware integration degree continuously increases, and increasingly more intelligent terminals also have a core component shown in FIG. 1, and support an NFC protocol. Therefore, in some scenarios, the acquiring apparatus may also be an intelligent terminal in which an acquiring application program is installed. A payment platform delivers a corresponding acquiring application program to the intelligent terminal, and invokes a built-in NFC component of the intelligent terminal by using the acquiring application program, to implement an acquiring function. Such an intelligent terminal can serve as the acquiring apparatus in the payment scenario.

In the embodiments of this specification, an acquiring apparatus serving as dedicated hardware is used as an example to describe one or more embodiments. However, it should be understood that this does not represent a limitation on a form of the acquiring apparatus. As described above, in a condition of having basic hardware for implementing an NFC function, any intelligent terminal can implement a function of an acquiring apparatus by installing an acquiring application program. In addition, the following describes various shapes, structures, etc. of the acquiring apparatus for illustrative purposes. However, these descriptions shall not be understood as a limitation on the acquiring apparatus in this specification. The acquiring apparatus in this specification can have any form, appearance, and structure.

Figure 1:
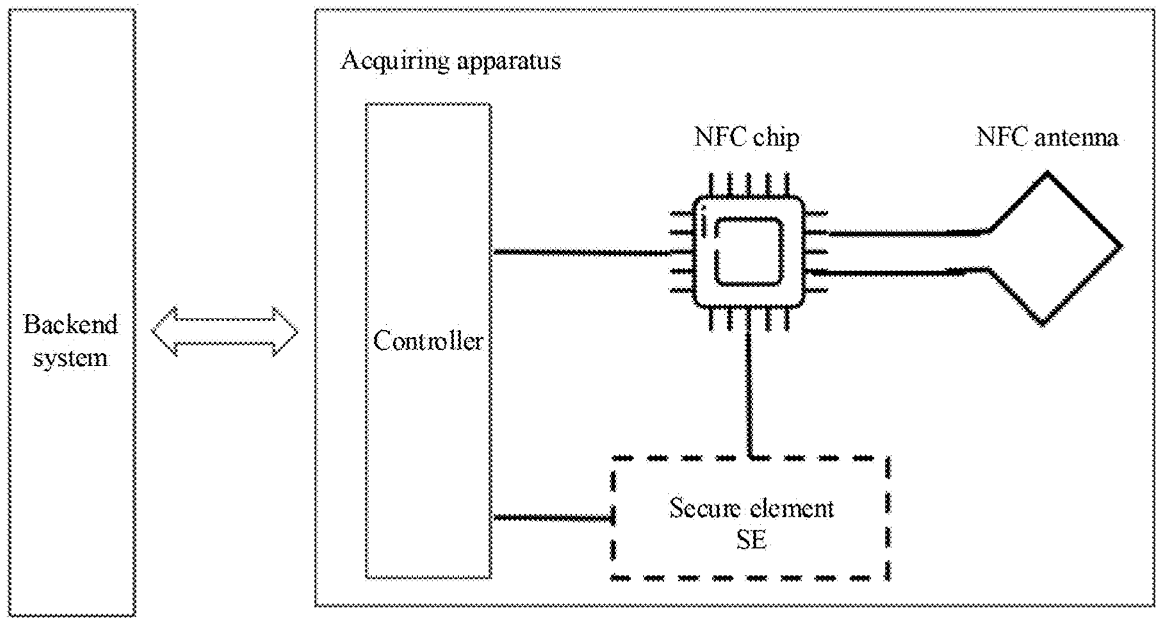
FIG. 1 is a schematic diagram of a structure of an acquiring apparatus that supports NFC.

FIG. 1 is a schematic diagram of a structure of an acquiring apparatus that supports NFC. It should be understood that, for a clear and concise purpose, FIG. 1 shows only components related to acquiring and payment performed by using an NFC technology, and other conventional components are ignored.

As shown in FIG. 1, the acquiring apparatus includes a controller. The controller may be implemented by using, for example, a microcontroller unit MCU or an application-specific integrated circuit chip ASIC, and is configured to control start and working of each internal component of the acquiring apparatus, and communicate with a backend system. Specifically, the controller may control working of the internal component of the acquiring apparatus based on instruction data transferred by the backend system, and send, after the acquiring apparatus reads information required for payment, the information to the backend system. The backend system can be a main acquiring system that runs on a cloud server and that is connected by using a network, or can be an acquiring application running on a local device. This is not specifically limited.

As a core that supports NFC payment, the acquiring apparatus has a near field communication (NFC) module, including an NFC chip and an NFC antenna. The NFC chip is responsible for communication data exchange and management based on an NFC protocol. The NFC antenna is configured to send and receive a radio frequency signal, and is usually designed as a coil that can generate an electromagnetic coupling with a coil of another NFC device, to implement data transmission based on the NFC protocol. Generally, a secure element (SE) is further disposed in the acquiring apparatus, and is configured to store sensitive data (for example, a key, a payment card token, and etc.). The security secure can be an embedded element (eSE) integrated in the NFC chip, or can be an independent external secure element (for example, a SIM card SE or an SD card SE).

As a type of NFC device, an NFC acquiring apparatus (more specifically, an NFC chip in the NFC acquiring apparatus) can use the following working modes: a card reader mode and a card emulation mode. In the card reader mode, the NFC device uses an active communication mode, and actively generates a radio frequency field by, and can actively initiate communication. The active communication mode is usually used in a scenario in which data needs to be exchanged quickly, for example, data exchange between a plurality of devices and device running parameter configuration. The active communication mode is characterized in that the NFC device can work independently and does not depend on an external radio frequency field. In the card emulation mode, the NFC device usually uses a passive communication mode, and does not actively generate a radio frequency field. Instead, the NFC device obtains electric energy by using a radio frequency field generated by an external sensing device (such as a card reader), to drive the chip in the NFC device to send data. This communication mode is common to a passive NFC device, such as a bank card, a bus card, and an NFC tag that support the NFC technology. After receiving a radio frequency field, an NFC chip inside the passive NFC device is driven by an induced current to send response data. The card emulation mode is characterized in that power is supplied through the radio frequency field of the external sensing device. Even if a main device (such as an IC card) has no built-in power supply, the main device can work normally.

Figure 2A:
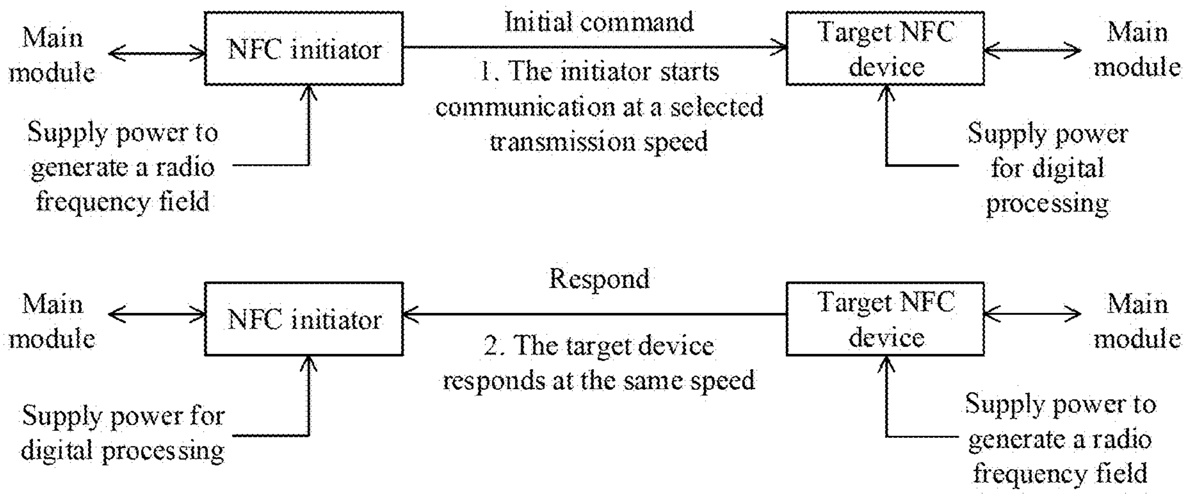
FIG. 2A is a schematic diagram in which both communication parties in NFC are in an active communication mode.

FIG. 2A is a schematic diagram in which both communication parties in NFC use an active communication mode. When the active communication mode is used, an NFC chip is powered by a power supply, and an NFC chip of each party participating in communication needs to send data to the other party, can autonomously generate a radio frequency. Referring to the accompanying drawing, an NFC initiator or a target NFC device generates a radio frequency signal when initiating communication or sending data (an initial command or response) to the other party, where the radio frequency signal can carry data through modulation; and transmits the radio frequency signal by power supplied by the NFC initiator or the target NFC device to form their respective radio frequency fields, to perform communication. This is a peer-to-peer network communication mode, and a fast communication connection can be obtained.

Figure 2B:
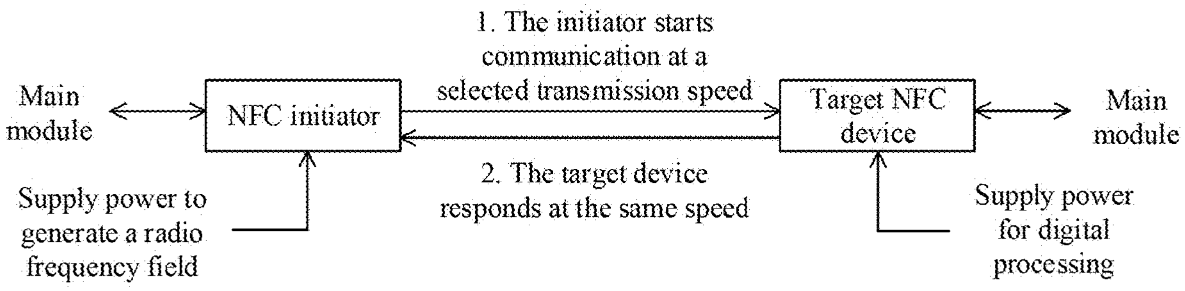
FIG. 2B is a schematic diagram in which one party in NFC is in an active communication mode and the other party is in a passive communication mode.

FIG. 2B is a schematic diagram in which one party in NFC uses an active communication mode and the other party uses a passive communication mode. The party that uses the active communication mode is in a card reader mode, and is an NFC initiator. A communication chip of the party is powered by a power supply to generate a radio frequency field. A target NFC device that uses a card emulation mode can be a passive device, and is generally in a power-off mode. When placed in the radio frequency field of the NFC initiator, an oscillation circuit of the target NFC device generates an induced current, to drive an NFC chip of the target NFC device to generate response data, and send the response data to the NFC initiator in the same radio frequency field.

In a typical scenario, an NFC acquiring apparatus such as a POS machine of a merchant is usually set to the card reader mode. In this mode, the acquiring apparatus can autonomously generate a radio frequency field, and attempt to capture response information of another sensing object in the radio frequency field, to read card information of an NFC card to complete payment. The NFC card herein includes an physical card that supports NFC, and a virtual card that is emulated by using an intelligent terminal (in this case, the intelligent terminal is in the card emulation mode).

Figure 3A:
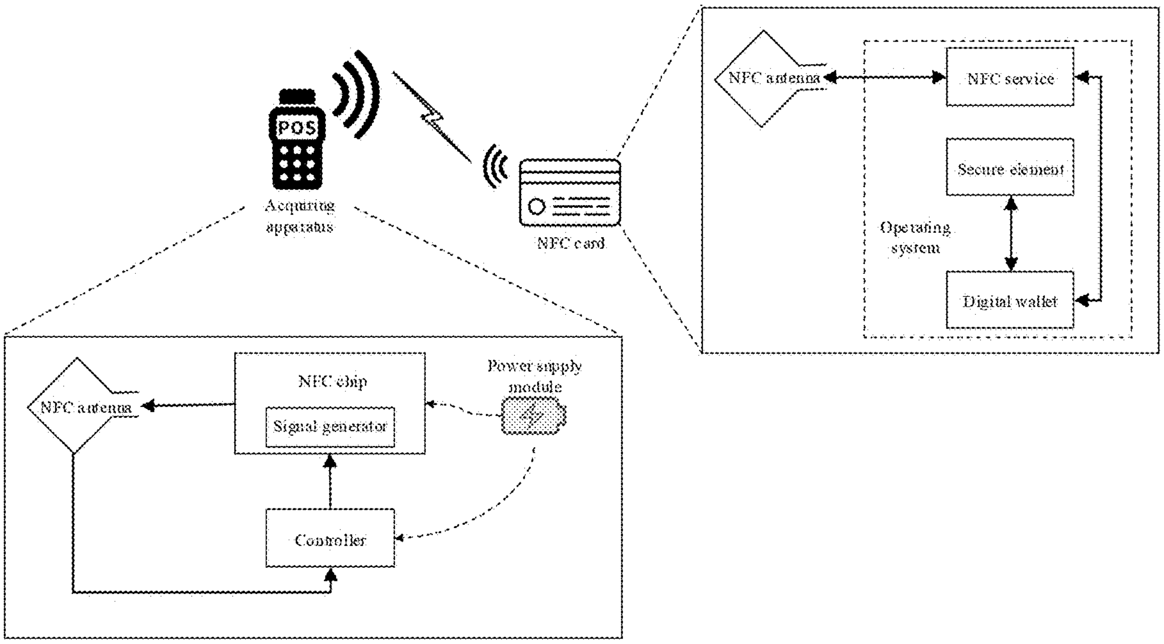
FIG. 3A is a schematic diagram of use of an acquiring apparatus in a card reader mode according to this specification.

FIG. 3A is a schematic diagram of use of an acquiring apparatus in a card reader mode. For the acquiring apparatus, only components used in the card reader mode are shown. As shown in the figure, in the card reader mode, when a controller in the acquiring apparatus detects a related interrupt signal or when a condition is met (for example, a control instruction sent by a peripheral MCU is received), the controller can control a signal generator in an NFC chip to enable radio frequency modulation to transmit a radio frequency signal by using an NFC antenna, to form a radio frequency field. Optionally, the acquiring apparatus can work in a low power card detection (LPCD) mode by default. The controller can determine, based on the interrupt signal, whether a sensing object is approaching; and when detecting a sensing object, control the signal generator to be started to generate a radio frequency signal.

The LPCD technology is a technology used to efficiently detect a neighboring NFC card or tag, and is mainly used to reduce device power consumption generated when an NFC card reader device waits for a sensing object to approach. The acquiring apparatus in the LPCD mode can periodically send a low-power consumption pulse as a detection signal. When another NFC sensing object is approaching, existence of the sensing object causes a change in an amplitude or a phase of the detection signal. Therefore, the acquiring apparatus can determine that another sensing object is approaching, and therefore exits the LPCD mode and switches to the normal card reader mode to work, to search for the NFC sensing object and establish communication. The LPCD technology is used to reduce power consumption, so that the acquiring apparatus is not limited to a fixed active installation, but can be deployed as a mobile acquiring terminal.

Still referring to FIG. 3A, specifically, in an application scenario, the acquiring apparatus continuously detects, in the LPCD mode, a sensing object approaching an NFC antenna sensing area of the acquiring apparatus. When an NFC card (sensing object) is approaching, field strength disturbance of the radio frequency field can enable the acquiring apparatus to detect approaching of the NFC card, so that the acquiring apparatus enables the normal card reader mode to work. The controller in the acquiring apparatus controls the signal generator to enable radio frequency modulation, to transmit a radio frequency signal by using the NFC antenna to establish communication with the NFC card to obtain card information of the NFC card, and then communicate with a backend payment system (which can be a transaction payment system built in the acquiring apparatus or can be a cloud payment system) to obtain a corresponding payment order and perform a payment transaction processing procedure. In another application scenario, the acquiring apparatus can be configured to: once a payment order delivered by a backend payment system is received, the controller actively starts the signal generator to perform radio frequency modulation, to transmit a radio frequency signal by using the NFC antenna, to generate a radio frequency field. An NFC card (sensing object) approaches the acquiring apparatus, enters the radio frequency field, and responds to the radio frequency signal transmitted by the acquiring apparatus in the radio frequency field, and the NFC card transmits card information by using the radio frequency field. After receiving the card information, the acquiring apparatus performs a payment transaction processing procedure based on the payment order.

Correspondingly, FIG. 3A further shows a schematic diagram of a corresponding NFC card device. A virtual bank card emulated by a smartphone is used as an example, and usually has an NFC antenna, an NFC service, a secure element, and a digital wallet. The NFC service can include an NFC chip hardware module and a system-level service interface for invoking the hardware. A customer can install a payment application, which may alternatively referred to as a digital wallet, in the smartphone, and the digital wallet provides an emulated bank card function. The customer can emulate, by using this function, a physical bank card with the customer' name into a virtual bank card, and install the virtual bank card in the smartphone. When payment needs to be performed, the customer can select a virtual bank card to be used for payment from the digital wallet, and the virtual NFC card is activated. When the smartphone approaches the acquiring apparatus working in the card reader mode, in response to the radio frequency signal transmitted by the acquiring apparatus, the digital wallet in the smartphone reads, by using the secure element, payment information of the bank card to be used for payment, and sends the payment information to the acquiring apparatus, and the acquiring apparatus performs a payment transaction processing procedure based on the payment information.

It can be understood that, if the NFC card is a physical card, an internal structure of the NFC card can include only a processing circuit and an NFC antenna.

Figure 3B:
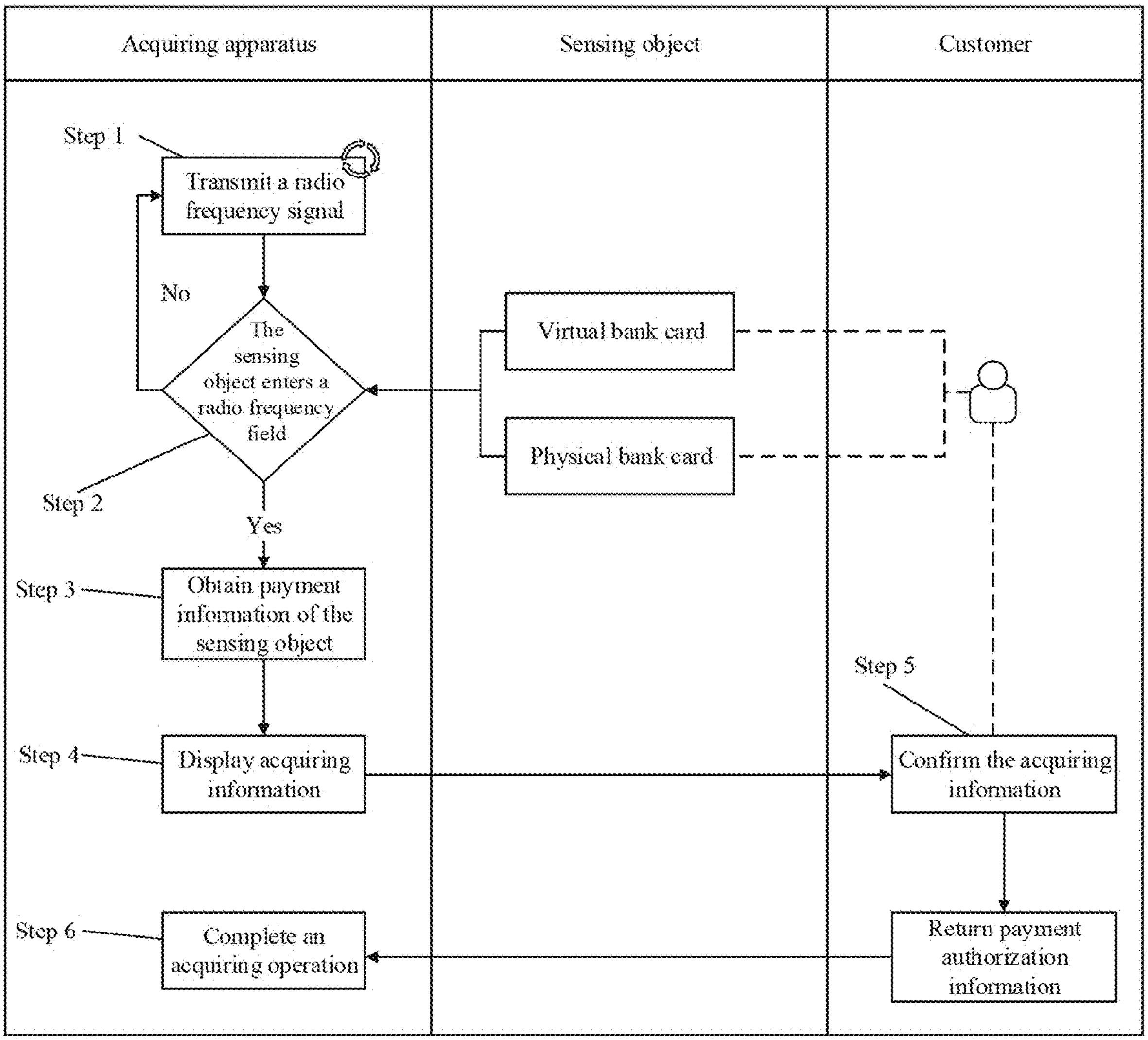
FIG. 3B is a flowchart of processing a payment transaction by an acquiring apparatus in a typical mode according to this specification.

Based on the acquiring apparatus and the NFC card device shown in FIG. 3A, an acquiring processing procedure shown in FIG. 3B can be performed. FIG. 3B discloses a flowchart of processing a payment transactions by an acquiring apparatus in a typical mode. As shown in the figure, the procedure can include the following steps:

Step 1: The acquiring apparatus equipped with an NFC function sends a radio frequency signal. As described above, after enabling the NFC function, the acquiring apparatus working in a card reader mode can send a radio frequency signal to generate a radio frequency field. The radio frequency field can activate an NFC sensing object within a preset distance (in this scenario, the NFC sensing object is the above-mentioned NFC card) to perform data exchange.

Step 2: A customer selects a bank card for payment on a smartphone, and places the smartphone approaching a sensing area of the acquiring apparatus; or the customer directly places a physical bank card for NFC payment approaching the sensing area of the acquiring apparatus.

Step 3: The acquiring apparatus obtains payment information of the sensing object in response to the radio frequency signal. The payment information can be written into the sensing object in advance, and is used to identify a payment channel and a payer identity that are used by the sensing object. For example, the payment information can include card identification information (for example, three elements of a bank card).

Step 4: The acquiring apparatus displays acquiring information to the customer for transaction confirmation. When the sensing object is a virtual bank card, the acquiring apparatus can send the acquiring information to a carrier of the sensing object, for example, the smartphone of the customer. When the sensing object is a physical bank card, the acquiring apparatus can print the acquiring information on a transaction voucher or a purchase order, or display the acquiring information to the customer by using a display module of the acquiring apparatus.

Step 5: The customer confirms the acquiring information. When the sensing object is a virtual bank card, the customer can confirm the acquiring on the corresponding smartphone. When the sensing object is a physical bank card, the customer can confirm the acquiring information in a manner of signing a bill, or confirm the acquiring information by using an interaction module of the acquiring apparatus. The above-mentioned confirmation manner includes but is not limited to a signature, an electronic signature, liveness detection, and password verification.

Step 6: Send payment authorization information to the acquiring apparatus, and the acquiring apparatus completes an apparatus operation.

It can be understood that orders of some steps in the above-mentioned procedure can be exchanged with each other based on an actual requirement, or some steps in the above-mentioned procedure can be omitted or deleted. For example, to further improve payment efficiency, if an acquiring amount is within a password-free payment amount of the customer, the acquiring information confirmation phase described in step 4 and step 5 can be skipped to automatically generate the payment authorization information.

In the above-mentioned payment procedure, when the sensing object is a virtual bank card emulated by the smartphone, a core of ensuring asset security of the virtual card is payment based on a token technology, and a key component is the secure element (SE) in the smartphone shown in FIG. 3A. In an NFC-related technical specification, for consideration of payment security, to perform card emulation, it is usually necessary to store important data by using the secure element, for example, store a payment token. Hardware isolation between common data and payment token data is implemented by using the secure element. The secure element is independent of other components of the smartphone at a physical level. The secure element has an independent execution environment and storage area, and communicates with the outside by using a security protocol, to prevent unauthorized software or hardware from tampering with content stored in the secure element. However, a digital wallet running in an operating system of the smartphone needs to access the secure element by using an interface authorized by the operating system. Specifically, when the smartphone emulates a bank card (or when the smartphone activates a virtual bank card), a card issuing bank can deliver one group (or more groups) of payment tokens to a payment application, and the digital wallet can invoke an access interface authorized by the operating system to store the payment tokens in the secure element. When performing payment, the digital wallet obtains, by using the access interface, the payment token stored in the secure element, and transmits the payment token to the acquiring apparatus by using an NFC technology. After receiving the payment token, an acquiring party to which the acquiring apparatus belongs performs token verification and settlement with the corresponding card issuing back, and performs a payment transaction processing procedure.

For consideration of security, permission to invoke the access interface of the secure element SE is set and managed by the operating system, which constituting some limitations while ensuring security. When the customer needs to emulate a bank card in the digital wallet of the smartphone, as described above, the digital wallet can access data in the digital wallet only after obtaining access authorization for the secure element of the smartphone, thereby emulating the bank card. However, access to the secure element is usually controlled by a terminal operating system operator. Some open operating systems can open the access interface of the secure element to the digital wallet, and the digital wallet can implement a bank card emulation function based on this, to support a customer operation in the payment scenario. However, some relatively closed operating systems often do not open the access interface of the secure element to a digital wallet of a third party. In these operating systems, it is difficult for the digital wallet to access the secure element (or it takes relatively high costs to obtain permission to access the secure element). As a result, the bank card emulation function cannot be implemented in a smartphone that runs these operating systems, which affects execution of a payment procedure in the payment scenario.

Therefore, in an implementation technology, a new acquiring apparatus of a type different from the above-mentioned typical mode and another acquiring processing method are proposed. Such a new acquiring apparatus works in a card emulation mode, and emulates merchant acquiring information as a virtual card or an NFC tag, so that when a sensing object having a card reader function is approaching, corresponding card information can be sent to complete payment and transaction. In a specific scenario, a smartphone can work in the card reader mode to read the merchant acquiring information carried in the NFC card emulated by the acquiring apparatus, to implement payment.

Figure 3C:
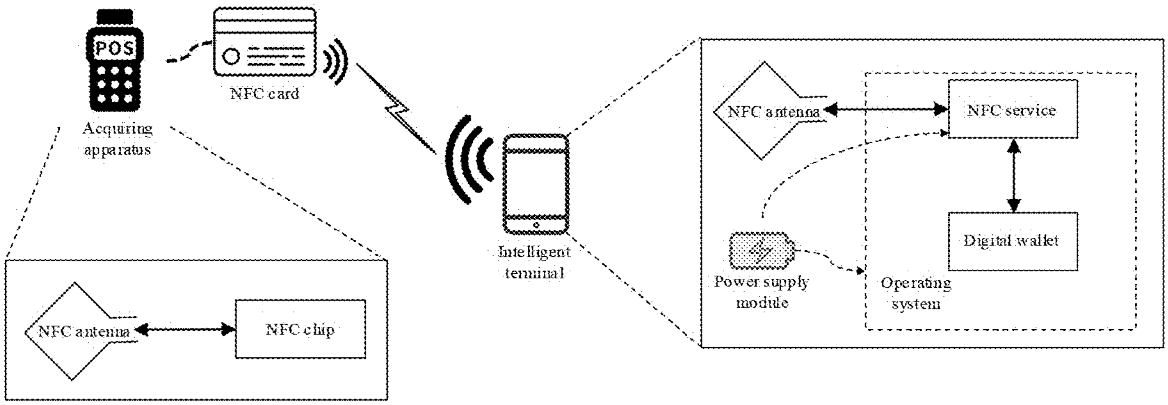
FIG. 3C is a schematic diagram of use of an acquiring apparatus in a card emulation mode according to this specification.

FIG. 3C is a schematic diagram of use of an acquiring apparatus in a card emulation mode. In the card emulation mode, when a sensing object working in the card reader mode approaches or touches the acquiring apparatus, a radio frequency field formed by a radio frequency signal transmitted by the sensing object excites an NFC antenna of the acquiring apparatus, to generate an induced current sufficient to drive an NFC chip. The NFC chip of the acquiring apparatus modulates (which may be passive modulation, for example, modulating a radio frequency signal by adjusting circuit impedance or capacitance) a radio frequency signal based on acquiring information (which may be static information written into the NFC chip in advance by using a backend system) to generate a response radio frequency signal that carries the acquiring information, and sends the response radio frequency signal to the sensing object to establish communication and perform a payment transaction processing procedure. In this scenario, a power supply module in the acquiring apparatus is often optional. The power supply module can be set to an additional MCU or be powered by through the NFC chip, to dynamically modulate a received radio frequency signal from a reader to generate a dynamic response radio frequency signal based on real-time acquiring information. Alternatively, the power supply module can be set to be powered by an additional excitation circuit, to increase strength of a response radio frequency signal field of the acquiring apparatus.

Correspondingly, FIG. 3C further illustrates a structure of an intelligent terminal. A smartphone working in the card reader mode is used as an example, and usually has a power supply module, an NFC antenna, an NFC service, and a digital wallet. The NFC service can include an NFC chip hardware module and a system-level service interface for invoking the hardware. A customer can install the digital wallet in the smartphone. When the NFC service of the smartphone detects a related interrupt signal or when a condition is met (for example, a control instruction for activating an NFC card reading function is received), the NFC service can enable radio frequency modulation to transmit a radio frequency signal by using the NFC antenna, to form a radio frequency field. After receiving a response radio frequency signal from the acquiring apparatus in the card emulation mode, the smartphone can perform a corresponding payment action based on acquiring information in the response radio frequency signal, including but not limited to a popping up a payment window, jumping to an acquiring, and invoking a corresponding digital wallet application interface. In addition, the customer can also actively enable the NFC service of the smartphone by enabling a related function of the digital wallet in the smartphone, and place the smartphone in the card reader mode. It can be learned that in this implementation technology, the smartphone does not need to perform card emulation on a bank card, and therefore, a secure element of the smartphone may not need to be accessed, thereby reducing dependence on permission of a terminal operator or an operating system.

Figure 3D:
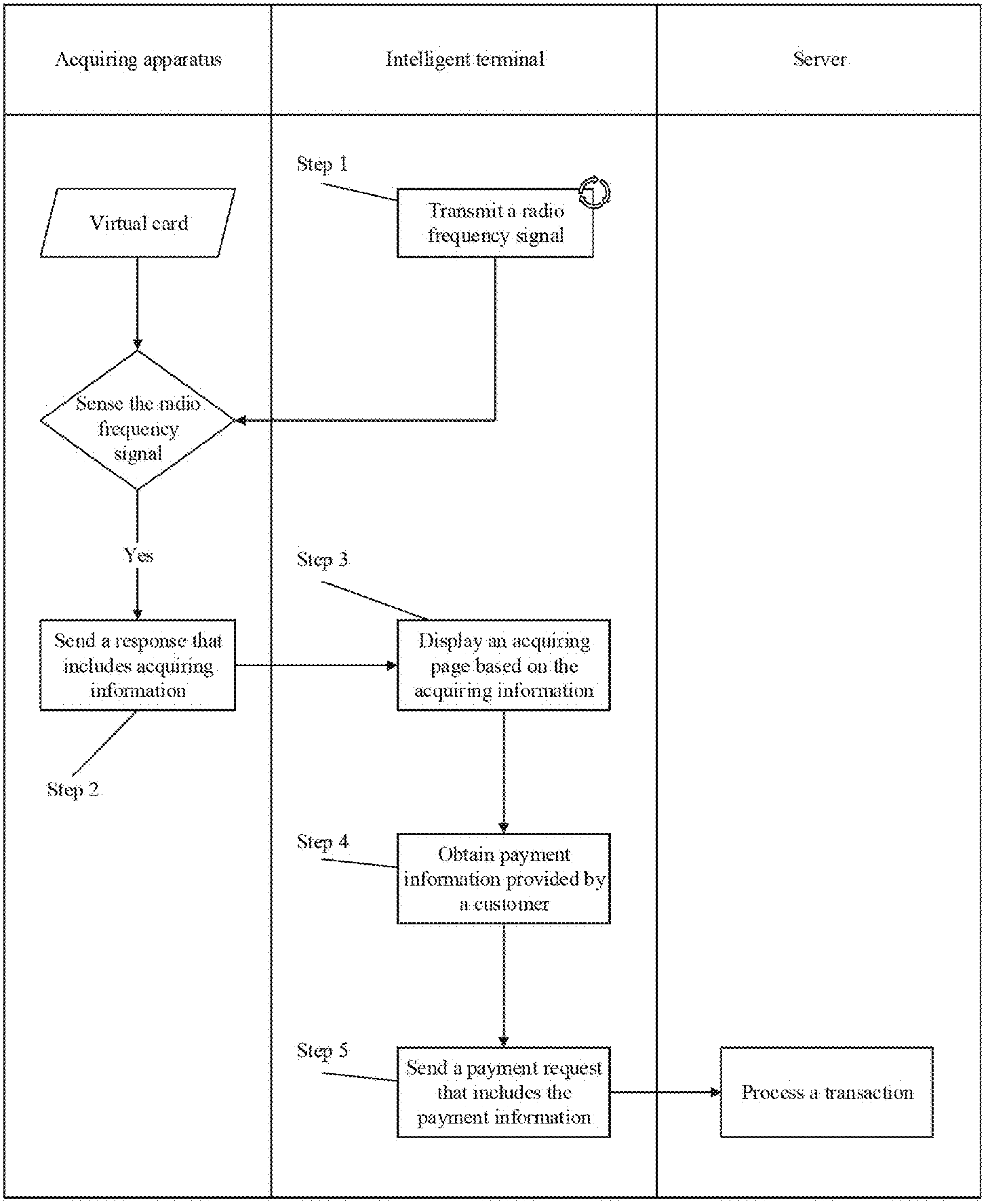
FIG. 3D is a flowchart of processing a payment transaction by an acquiring apparatus in a new mode according to this specification.

To more clearly describe a payment transaction processing procedure in this mode, FIG. 3D discloses a flowchart of processing a payment transaction by an acquiring apparatus using this implementation technology. As shown in the figure, the procedure can include the following steps:

Step 1: An intelligent terminal having an NFC function sends a radio frequency signal used to activate an NFC sensing object. The intelligent terminal can be a portable or wearable mobile terminal, such as a smartphone or a smart watch. The intelligent terminal works in a card reader mode, and can send a radio frequency signal to generate a radio frequency field, to activate an NFC sensing object within a preset distance. The NFC sensing object can be a passive NFC tag or an NFC virtual card (in this scenario, the NFC sensing object is a virtual card emulated by the acquiring apparatus). After entering the radio frequency field of the intelligent terminal, the NFC sensing object can generate a sensing radio frequency signal to exchange data with the intelligent terminal.

Step 2: In response to the radio frequency signal of the intelligent terminal, the acquiring apparatus sends confirmation information including acquiring information to the intelligent terminal. A virtual card is used as an example. The acquiring apparatus can write acquiring information of a merchant into NFC virtual card information in advance. The acquiring information can be information about a cashier website for a customer to perform payment, or can be information (for example, a package name and Intent information) about a payment application that needs to be evoked. The intelligent terminal can evoke an acquiring page or a digital wallet based on the received acquiring information.

Step 3: The intelligent terminal displays the acquiring page based on the acquiring information. The acquiring page can be understood as a payment platform page of a party to which the acquiring apparatus belongs, or a transaction platform page of an acquiring party or a card organization associated with the acquiring apparatus.

Step 4: The intelligent terminal obtains payment information that is provided by the customer based on the acquiring page. The payment information that the customer can fill in the acquiring page and submit can include a payment amount and a payment manner. The payment information includes payment element information necessary for performing an acquiring transaction. This is not specifically limited herein. In actual application, the acquiring apparatus can write an acquiring amount into virtual card information in advance. When displaying the acquiring page to the customer, the intelligent terminal can automatically bring the acquiring amount out. The customer can also automatically set a payment amount. The acquiring page can further include a transaction confirmation control used to submit the payment information. For example, the transaction confirmation control can be a submit button, and the customer can tap the submit button to submit the payment information. Alternatively, the transaction confirmation control can be a time control. If the customer does not perform a submission action in a preset time window, it is considered that the current acquiring transaction expires.

Step 5: The intelligent terminal sends a payment request including the payment information to a server, where the server is configured to process a transaction based on the payment request. The intelligent terminal can encapsulate the payment information submitted by the customer to generate the payment request, and send the payment request to the server, so that the server can process and complete the transaction based on the received payment request. The payment request can include information about both parties in the transaction, a transaction amount, a transaction manner, etc. In actual application, the payment request can include an acquiring account (for example, an acquiring account of the merchant written into a virtual card by the acquiring apparatus), a payment account (for example, a bank card account filled in by the customer), and a payment amount (for example, the payment amount can be an acquiring amount written into the virtual card by the acquiring apparatus, or can be an amount filled in by the customer on the acquiring page).

It can be understood that orders of some steps in the above-mentioned procedure can be exchanged with each other based on an actual requirement, or some steps in the above-mentioned procedure can be omitted or deleted. For example, to further improve payment efficiency, if an acquiring amount is within a password-free payment amount of the customer, the step of submitting and confirming the payment information by the customer described in step 4 can be skipped, and the intelligent terminal automatically generates the payment request and sends the payment request to the server.

When an intelligent terminal (such as a smartphone) having an NFC function approaches another NFC sensing object (such as a virtual card emulated by the acquiring apparatus), near field communication is established between the two by using a radio frequency field. A technical basis for implementing this process is a low power card detection (LPCD) technology of the intelligent terminal. Similar to the above-mentioned acquiring apparatus in the LPCD mode, in the LPCD mode, the intelligent terminal disables a radio frequency field in when there is no NFC sensing object around the intelligent terminal, and only sends a low-power consumption detection signal, to reduce power consumption and prolong a battery life. When the intelligent terminal approaches another NFC sensing object, the intelligent terminal detect impact of the NFC sensing object on the detection signal, and therefore exit the LPCD mode and place the NFC module in the normal card reader mode to work, to search for the NFC sensing object and establish communication.

Because of a low power consumption characteristic of the LPCD, an intelligent terminal that uses the LPCD technology can send an NFC detection signal in real time. It is not difficult to understand that, in a scenario in which the implementation technology is applied, the intelligent terminal can detect, in real time, another NFC sensing object (for example, an acquiring apparatus emulated as a virtual card) approaching the intelligent terminal, and obtain, through NFC, acquiring information that is written into an emulated card by the acquiring apparatus, so that the intelligent terminal can display an acquiring page based on the acquiring information, and a customer can submit payment information on the page, to complete the acquiring payment. In this way, the customer does not need to find a digital wallet in advance, and then selects a payment card to perform a corresponding payment operation. The intelligent terminal can display the acquiring page to the customer dynamically based on the acquiring information of the acquiring apparatus, and the acquiring page is presented in a variety of forms, which can be automatic application jump, dynamic widget pop-up display that does not affect a front-end application if the customer, etc. With reference to the above-mentioned description of the method, it can be learned that, in a scenario in which small-amount password-free payment is performed, expected customer experience of "touch to pay" can be achieved.

To simplify the description, in the following, an NFC payment manner in which the acquiring apparatus is in the card reader mode and a payment tool is in the card emulation mode is referred to as a first NFC payment manner, and an NFC payment manner in which an acquiring apparatus is in the card emulation mode and a payment tool is in the card reader mode is referred to as a second NFC payment manner.

It can be learned from the two NFC payment scenarios listed above that, depending on a network environment in which a customer is located and different intelligent devices used, the customer can prefer to use the first NFC payment manner or the second NFC payment manner. Therefore, the acquiring apparatus needs to respond in a corresponding working mode. However, because the NFC technology has a unidirectional communication role and a unidirectional communication function that are described above, in actual application, an NFC device can be used in only one of different working modes to adapt to a corresponding communication scenario, and cannot respond to a communication scenario corresponding to another working mode. For example, the acquiring apparatus in the card reader mode can communicate with a sensing object such as a physical card or a virtual card, but the acquiring apparatus cannot respond to those sensing objects that also run in the card reader mode, because both the acquiring apparatus and the sensing objects are waiting to receive data rather than sending data. In the card emulation mode, the acquiring apparatus can communicate with a sensing object having a card reader function, but the acquiring apparatus cannot respond to those sensing objects that also run in the card emulation mode, because both the acquiring apparatus and the sensing objects are waiting to respond to a communication request rather than actively initiating communication. As a result, working modes of the acquiring apparatus and the sensing object are mismatched.

In addition, in the context in which a payment platform focuses on expanding global services, payment preferences of consumers in each country or region further need to be considered in deployment of the acquiring apparatus. Specifically, popularity of digital payment and mobile payment varies globally. In some regions, a consumer is accustomed to scanning a physical bank card for payment. Therefore, the payment platform needs to deploy, at a merchant end, an acquiring apparatus working in the card reader mode to read information about the physical bank card. In some regions, a consumer is accustomed to performing payment in the second NFC payment manner by using an NFC function of an intelligent terminal, and the payment platform needs to deploy, at a merchant end, an acquiring apparatus working in the card emulation mode, so that the intelligent terminal reads acquiring information.

Further, payment scenarios in reality are far more complex than the above-mentioned cases. A requirement for the second NFC payment manner also exists in the region accustomed to scanning a card for payment. On the contrary, a requirement for the first NFC payment manner cannot be ignored in a region that prefers the second NFC payment manner. In this case, if only an acquiring apparatus that supports a single NFC payment manner is deployed, diverse payment requirements of consumers cannot be met, which limits a service range of a merchant and payment experience of the consumer.

In some implementation technologies, to cope with complexity of the payment scenario, a dual deployment policy is used in deployment of the acquiring apparatus. To be specific, at the merchant end, an acquiring apparatus A working in the card reader mode is deployed, and an acquiring apparatus B working in the card emulation mode is also deployed, to adapt to different payment habits of consumers. When a consumer displays a physical bank card or a virtual card, a merchant needs to read card information by using the acquiring apparatus A, to complete an acquiring transaction. When the consumer uses an intelligent terminal working in the card reader mode to perform payment, the merchant needs to send acquiring information to the intelligent terminal by using the acquiring apparatus B, to complete an acquiring transaction. This technical solution provides support for two payment scenarios. However, disadvantages of the technical solution are obvious: Two independent acquiring apparatuses need to be deployed for the merchant, which means that the merchant needs to simultaneously open and manage two acquiring channels, adding difficulties to actual operations. In addition, the merchant further needs to bear additional costs, including costs of an additional acquiring apparatus and costs of training cashiers to ensure that they can accurately identify a type of a payment tool of a consumer and use a corresponding acquiring apparatus to complete a transaction.

As described above, many challenges faced in diversified transaction processing scenarios and acquiring apparatus deployment environments are highlighted, and an acquiring apparatus that supports only a single NFC working mode limits and restricts development of a payment service.

To resolve the above-mentioned problem, in the embodiments of this specification, a new acquiring apparatus and a control method for an acquiring apparatus are proposed. According to a technical concept of this solution, an improved acquiring apparatus is designed, which can simultaneously support different working modes in a near field communication technology, that is, a card reader mode and a card emulation mode, and interact with a sensing object in one of the working modes based on a scenario condition, thereby considering both a first NFC payment mode and a second NFC payment mode.

Figure 4A:
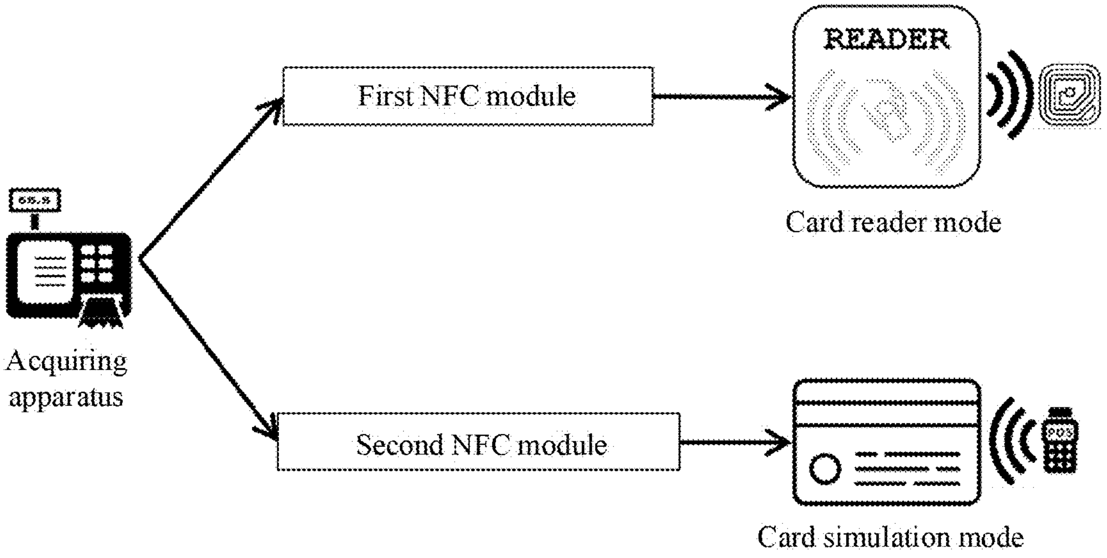
FIG. 4A is a schematic diagram of an implementation framework of an acquiring apparatus according to an embodiment of this specification.

FIG. 4A is a schematic diagram of an implementation framework of an acquiring apparatus according to one or more embodiments of this specification. Referring to the accompanying drawing, an NFC component connected to a controller in the acquiring apparatus includes a first near field communication module and a second near field communication module, which are referred to as a first NFC module and a second NFC module below for short. The first NFC module works in a card reader mode, to transmit a radio frequency signal and attempt to capture response information of a sensing object. In the card reader mode, the acquiring apparatus can be used as a card reader to read related information from a sensing object (for example, an IC card, a poster, an electronic tag, etc.) that supports a near field communication technology. The second NFC module works in a card emulation mode, to sense a radio frequency signal sent by a sensing object. In the card emulation mode, the acquiring apparatus emulates a smart card or tag that uses the near field communication technology, to be read as a sensing object of a card reader.

In different embodiments, the first NFC module and the second NFC module can be implemented in different manners and can work in coordination in different manners. For example, in an implementation, the first NFC module and the second NFC module can be modules independent of each other, and the two modules can work simultaneously. In another implementation, the first NFC module and the second NFC module can be implemented by a same NFC module, and the same NFC module can separately work as the first NFC module or the second NFC module in different conditions.

Figure 4B:
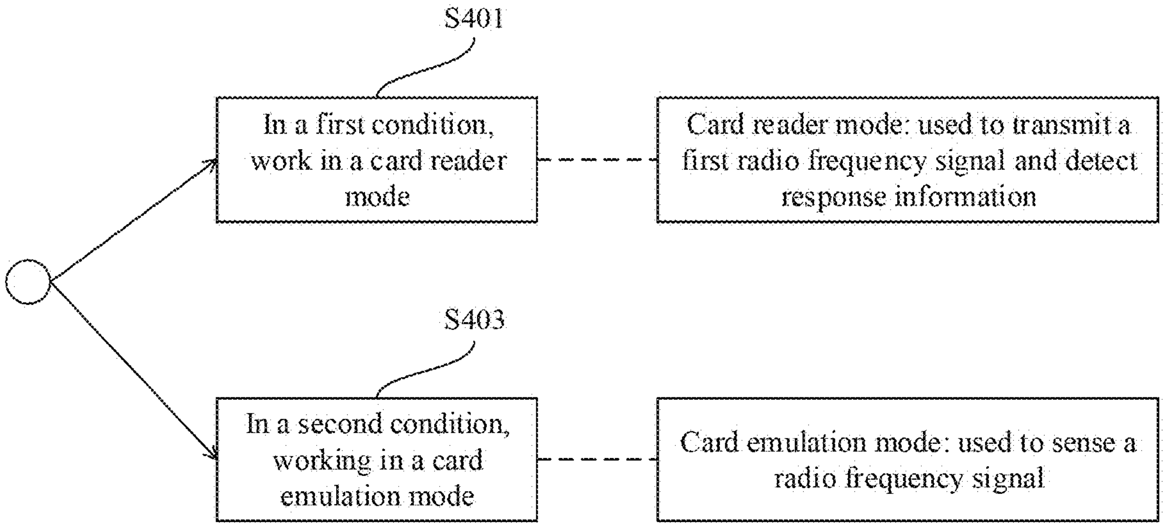
FIG. 4B is a flowchart of a control method for an acquiring apparatus according to an embodiment of this specification.

According to the above-mentioned technical concept, FIG. 4B is a flowchart of a control method for an acquiring apparatus according to an embodiment of this specification. An implementation body of the method can be an acquiring apparatus that supports a near field communication technology, and can be more specifically a controller in the acquiring apparatus. From a software perspective, the implementation body can also be an application program that runs on an intelligent device. Referring to FIG. 4B, in an embodiment, the method includes at least the following steps. S401: Enable, in a first condition, a first NFC module to work in a card reader mode, to transmit a first radio frequency signal, detect first response information, and obtain customer payment information based on the first response information. S403: Enable, in a second condition, a second NFC module to work in a card emulation mode, to send second response information including merchant acquiring information in response to sensing a second radio frequency signal.

Through disposing of dual modules, the acquiring apparatus supports both the card reader mode and the card emulation mode, and establishes near field communication with a current sensing object by using an appropriate working mode in different scenario conditions, thereby implementing that a single acquiring apparatus supports two NFC payment manners. Various implementations of the acquiring apparatus and control method therefor in this specification are described in detail below.

Implementation 1

Figure 5A:
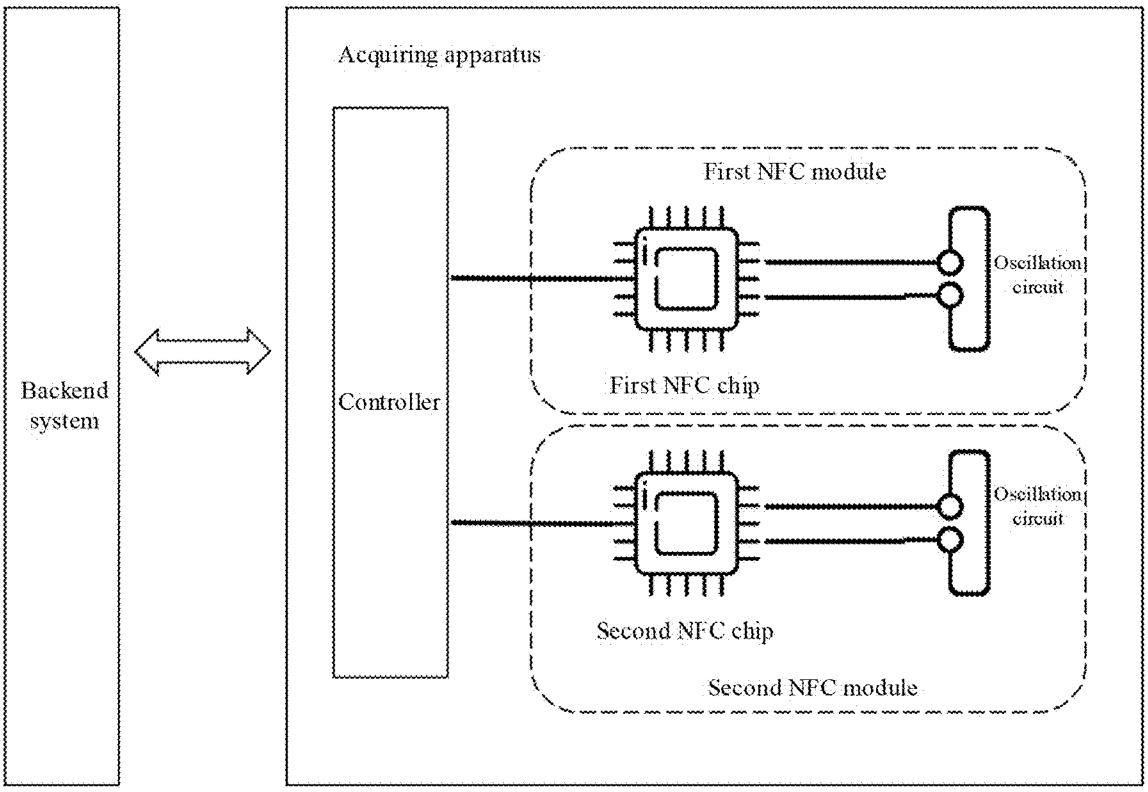
FIG. 5A is a schematic diagram of an internal structure of an acquiring apparatus according to an implementation.

FIG. 5A is a schematic diagram of an internal structure of an acquiring apparatus according to an implementation. As shown in FIG. 5A, in this implementation, a near field communication component in the acquiring apparatus includes two NFC chips: a first NFC chip and a second NFC chip. The first NFC chip is configured to process data in a card reader mode, and the second NFC chip is configured to process data in a card emulation mode. Each NFC chip is connected to an oscillation circuit. The oscillation circuit includes or functions as an NFC antenna, and is configured to transmit a radio frequency signal to form a radio frequency field, or can be configured to sense an external radio frequency field to generate an induced current. It should be understood that, in a normal circuit layout, each NFC chip has its own oscillation circuit, to work at a preset oscillation frequency and avoid interference. In some other circuit layout examples, different NFC chips can alternatively share a same oscillator circuit, and modulation load by adjusting resistance or capacitance.

An example in which the first NFC chip and the second NFC chip are respectively connected to dedicated oscillation circuits to form a corresponding first NFC antenna and a corresponding second NFC antenna is used for description. In this case, the first NFC chip and the first NFC antenna form the above-mentioned first NFC module. The first NFC module works in the card reader mode, to transmit a radio frequency signal and attempt to capture response information of a sensing object. The second NFC chip and the second NFC antenna form the above-mentioned second NFC module. The second NFC module works in the card emulation mode, to sense a radio frequency signal sent by a sensing object, and make a response when sensing an external radio frequency signal.

In an embodiment, a controller enables, in response to receiving an acquiring instruction of a merchant, the first NFC module and the second NFC module to work simultaneously. Once any module senses signal data supported by the module, the module starts to perform payment-related interaction with the sensing object.

Figure 5B:
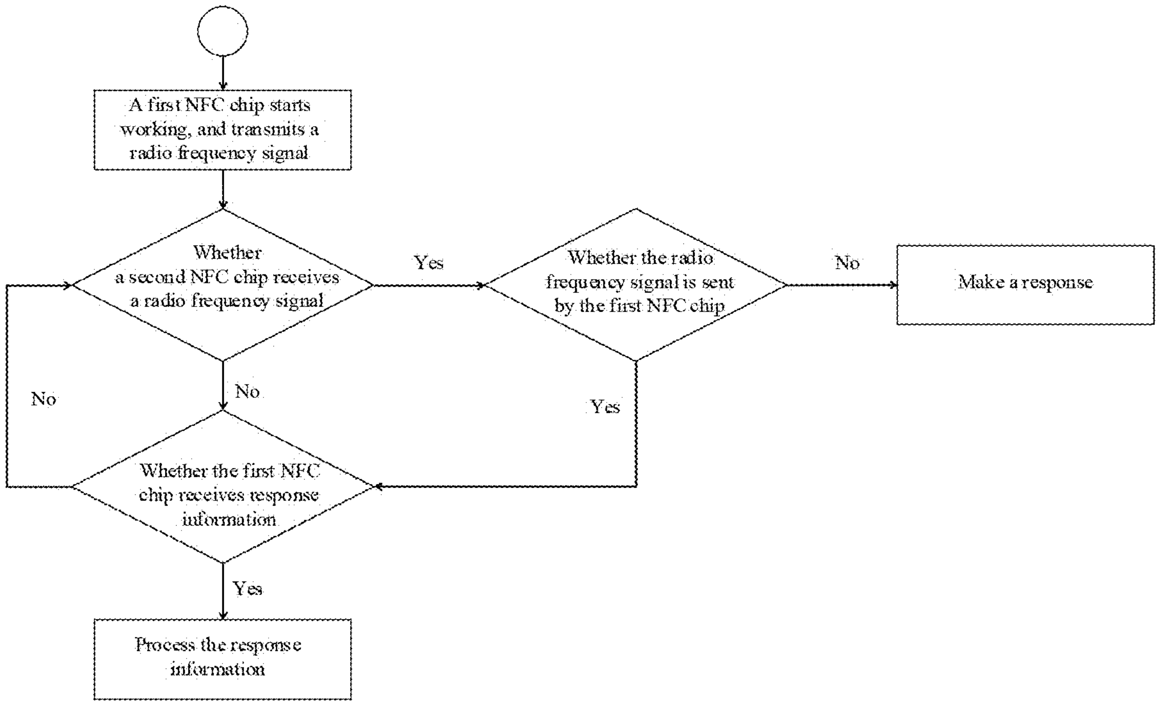
FIG. 5B is a diagram of a control procedure according to an embodiment of this specification.

Further, to avoid interference between the two modules and optimize working manners of the two modules, the controller controls working of the two modules by using a procedure shown in FIG. 5B. As shown in FIG. 5B, after a merchant enables acquiring, the first NFC module starts running, continuously sends a first radio frequency signal to form a first radio frequency field, and detects whether first response information is received. If the first response information is received, the first NFC module can perform corresponding processing on the response information. The second NFC module working in the card emulation state detects whether a radio frequency signal is received. When a radio frequency signal is received, the controller determines whether the radio frequency signal is sent by the first NFC module. If the radio frequency signal is sent by the first NFC module (for example, may be caused by ineffective shielding of the radio frequency signal or may be caused by a resonance), the radio frequency signal is an interference signal and may not be responded. This case can be equivalent to that the second NFC module does not detect an external radio frequency signal. In another aspect, when the second NFC module detects a second radio frequency signal from the outside of the acquiring apparatus, the second NFC module can respond to the radio frequency signal. In the above-mentioned description, processing the response information or responding the radio frequency signal may be performed in an asynchronous manner. In other words, subsequent processing of a received valid radio frequency signal by the acquiring apparatus may not affect the NFC module continues in detecting another radio frequency signal. In addition, it should be understood that, in the procedure shown in the accompanying drawing, signal detection operations of the first NFC module and the second NFC module can be performed alternately, but this does not represents a limitation. In some embodiments, the first NFC module and the second NFC module can simultaneously perform a signal detection operation in a parallel policy.

Optionally, the acquiring apparatus can set different sensing areas for the first NFC module and the second NFC module, that is, a first sensing area and a second sensing area. The first sensing area corresponds to the first NFC module, and can be near or includes a position area in which the first NFC antenna is located. The second sensing area corresponds to the second NFC module, and can be located near or include a position area in which the second NFC antenna is located. If a sensing object approaches or touches the first sensing area, the first NFC module working in the card reader mode sends a radio frequency signal to attempt to read information from the sensing object; or if a sensing object approaches or touches the second sensing area, the second NFC module working in the card emulation mode attempts to sense a radio frequency signal from the sensing object.

More specifically, in an embodiment, the first NFC module can be in a low power consumption state by default by using an LPCD technology. When another NFC sensing object approaches or touches the first sensing area, existence of the sensing object causes a change in a low-power consumption detection signal, so that the first NFC module exits the LPCD mode, enters the normal reader mode, and starts to transmit the first radio frequency signal to establish the first radio frequency field, to seek to establish communication with the NFC sensing object. The sensing object can return the first response information to the first NFC module based on the first radio frequency field, where the first response information can include card information used for payment, so that the acquiring apparatus completes acquiring.

The second NFC module works in the card emulation mode. When a sensing object (that is, a card reading device) working in the card reader mode approaches or touches the second sensing area, a radio frequency field formed by a radio frequency signal transmitted by the card reading device excites the NFC antenna in the second NFC module to generate an induced current sufficient to drive the second NFC chip. The second NFC chip then generates second response information based on acquiring information, generates, through signal modulation, a response radio frequency signal that carries the second response information, and sends the response radio frequency signal to the card reading device to establish communication, to perform a payment transaction processing procedure.

Appearance of the acquiring apparatus can be correspondingly designed, so that a customer can clearly distinguish between the first sensing area and the second sensing area. Preferably, corresponding icons can be set in the above-mentioned two areas that can be distinguished, so that the customer knows functions of the two sensing areas. For example, a bank card icon can be designed in a corresponding part of the first sensing area. In this way, when the customer is ready to use a bank card or a virtual card to perform payment, the customer can place the card approaching the first sensing area. In this case, the acquiring apparatus serves as a card reader by using the first NFC module to read card information of the customer for payment. In contrast, an icon similar to a mobile phone in a card reading state or a to-be-read acquiring code can be designed in a corresponding part of the second sensing area. When the customer is ready to use a smartphone serving as a card reader to perform payment, the customer can place the mobile phone approaching the second sensing area. In this case, the acquiring apparatus works in the card emulation mode by using the second NFC module, and transmits merchant acquiring information as response information to the mobile phone, so that the customer performs payment.

Figure 5C:
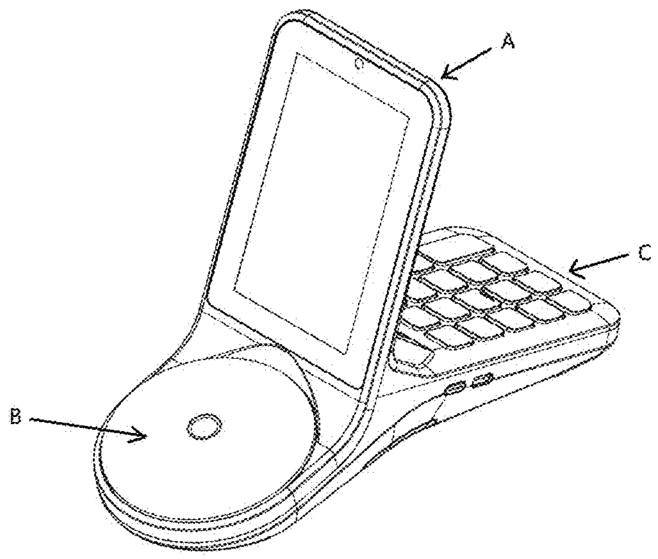
FIG. 5C is a schematic diagram of an external structure of an acquiring apparatus according to an embodiment.

FIG. 5C is a schematic diagram of an external structure of an acquiring apparatus according to an embodiment. As shown in the figure, in this design, the acquiring apparatus has two sensing areas: an area A and an area B. The area A corresponding to the first NFC module, and the area B corresponds to the second NFC module. A keyboard area C is used by a merchant to input merchant acquiring information such as an amount and a control instruction. The area A can be a front surface or a back surface of an oblique surface. When detecting that a customer places an NFC device of the customer approaching the area A, the acquiring apparatus serves as a card reader by using the first NFC module to read card information. The area B corresponds to an area disk-shaped surface at a bottom. When detecting that a customer places an NFC device of the customer approaching the area B, the acquiring apparatus works in the card emulation mode by using the second NFC module, and provides merchant acquiring information to a card reading device held by the customer, so that the customer completes payment.

Although the two sensing areas in FIG. 5C are designed as two surfaces at an angle, this is only an example. In another example, the first sensing area and the second sensing area can alternatively be designed as two plane areas side by side, two planes back to back, etc.

Figure 5D:
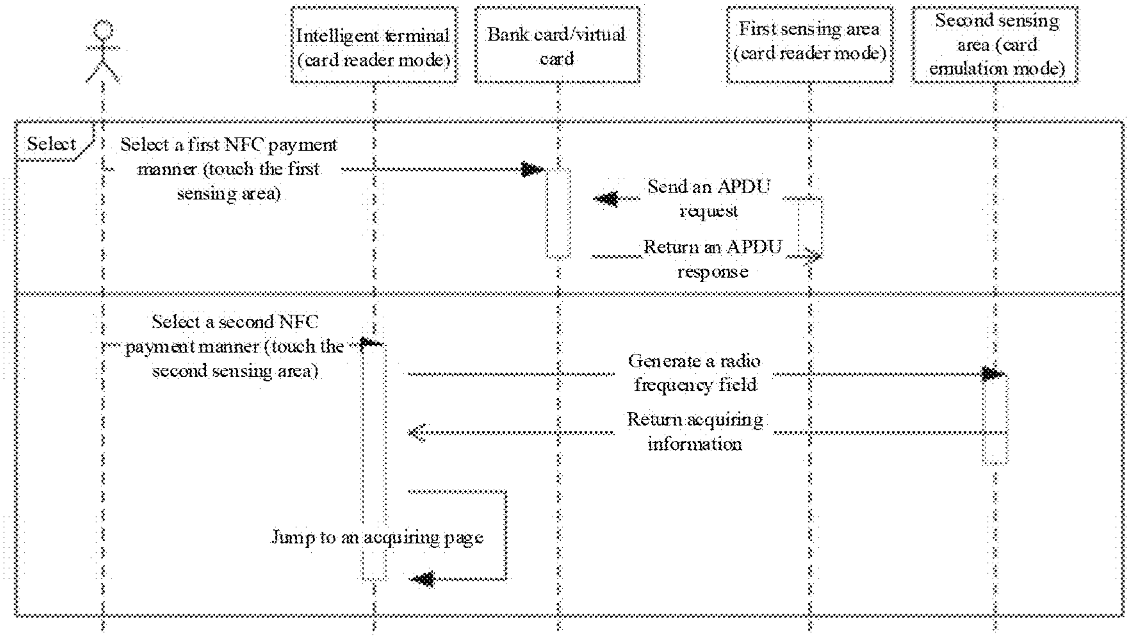
FIG. 5D is a diagram of a transaction processing procedure according to an embodiment.

The following describes in detail an acquiring processing process by using a solution in which two sensing areas are set as an example. FIG. 5D is a diagram of a transaction processing procedure according to an embodiment. Before payment starts, a merchant orders a transaction, and transmits related acquiring information to an acquiring apparatus (the acquiring information can be input by the merchant on the acquiring apparatus, or can be obtained by the acquiring apparatus from a server). In this case, a customer can start payment. A payment manner is determined by the customer. Based on different payment manners, the customer needs to place a payment tool approaching a corresponding sensing area.

Referring to FIG. 5D, when the customer chooses to use a first NFC payment manner, the customer needs to hold a bank card/virtual card approaching or touching a first sensing area of the acquiring apparatus. A first NFC module in the first sensing area works in a card reader mode, and can detect a sensing object entering a radio frequency field of the first NFC module. When detecting a payment card of the customer, the first NFC module sends a radio frequency signal to read information about the payment card. To be specific, the acquiring apparatus sends an APDU request, and the bank card/virtual card encapsulates card information into an APDU response in response to the request, and returns the APDU response to the acquiring apparatus. The acquiring apparatus completes the transaction based on the obtained card information. An application protocol data unit (APDU) is an encapsulation format of a message between a card reader and a smart card. During NFC data transmission, both communication parties can use the data format to encapsulate information to standardize a communication standard. It can be understood that, the APDU is merely used as an example to describe the above-mentioned communication process, and does not represent a limitation on a format of an NFC message.

Still referring to FIG. 5D, when the customer chooses to use a second NFC payment manner, the customer needs to hold an intelligent terminal working in the card reader mode approaching or touching a second sensing area of the acquiring apparatus. A second NFC module in the second sensing area works in the card emulation mode, and can send response information for a card reading device to read acquiring information. After the second NFC module is activated by a radio frequency field of the intelligent terminal, the module returns an NFC message including the acquiring information to the intelligent terminal, and the intelligent terminal can jump to a corresponding acquiring page (which can alternatively be a corresponding payment application in some examples) based on the acquiring information, and display the acquiring information to the customer to complete the transaction.

It can be understood that, in this implementation, the acquiring apparatus supports two working modes by using two NFC modules, which can be intuitively provided to a customer, so that the customer selects one of the two NFC modes for use, thereby greatly improving payment convenience.

Implementation 2

This specification further proposes an implementation solution that supports two working modes based on a single NFC module. According to the solution architecture, a single NFC module in an acquiring apparatus supports two working modes: a card reader mode and a card emulation mode, and mode switching can be performed under an indication of a control signal.

In an embodiment, an NFC chip in the single NFC module can include a first circuit part configured to perform data processing in a card reader mode, a second circuit part configured to perform data processing in a card emulation mode, and a shared circuit part configured to process a general NFC protocol. Specifically, the data processing performed by the first circuit part can include encapsulation of an APDU request, parsing of an APDU response, preliminary processing performed on card information obtained through parsing, etc. The data processing performed by the second circuit part can include coding and modulation of merchant acquiring information, etc. It should be noted that in some chips, different data processing logic is executed by using different circuit parts that are structurally visible. However, more generally, in many chips, it may be difficult to divide circuits that perform different data processing into different circuit parts that are structurally visible. Therefore, the first circuit part and the second circuit part should be understood as division in terms of data processing logic rather than division in terms of structure.

Further, when the first circuit part in the NFC chip is activated to work, the NFC chip and an NFC antenna function as a first NFC module, and work in the card reader mode. When the second circuit part in the NFC chip is activated to work, the NFC chip and the NFC antenna function as a second NFC module, and work in the card emulation mode. In this way, a single NFC module can work in the card reader mode and the card emulation mode in a time division manner, and can be switched between the two modes.

In an embodiment, the NFC chip is a unique NFC chip of the acquiring apparatus. In another embodiment, the NFC chip is one of a plurality of NFC chips of the acquiring apparatus. For example, the acquiring apparatus can have two NFC chips, as shown in FIG. 5A, where one NFC chip supports a single mode and the other NFC chip supports dual modes. For example, the first NFC chip supports only the card reader mode, and the second NFC chip supports the dual modes. When both the two NFC chips are enabled, the second NFC chip is set to be in the card emulation mode, so that the two NFC chips work in different modes. In some cases (for example, due to a power saving requirement or inconvenience in use of a sensing area), a merchant can also disable an NFC chip (for example, the first NFC chip) in a single mode and enable an NFC chip (for example, the second NFC chip) that supports dual modes. In this case, the enabled NFC chip works in the card reader mode and the card emulation mode in a time division manner, so that the acquiring apparatus has both card reading function and a card emulation function.

The following describes embodiments of switching a working mode of a single NFC module that supports dual modes.

Embodiment 1

According to an implementation, an acquiring apparatus can switch between two working modes based on a setting of a merchant. For example, when a customer is ready to use a physical bank card that supports NFC to perform payment, the merchant determines that the acquiring apparatus currently needs to use a card reader mode, and therefore can send a first setting instruction by using a background control system of the acquiring apparatus. A controller in the acquiring apparatus sends a first control signal to an NFC chip in response to the first setting instruction. The NFC chip activates a first circuit part based on the first control signal, and functions as a first NFC module together with an NFC antenna to work in the card reader mode. When the customer is ready to use an NFC device in the card reader mode (for example, a smartphone in the card reader mode) to perform payment, the merchant determines that the acquiring apparatus currently needs to use a card emulation mode, and therefore can send a second setting instruction by using the background control system. The controller sends a second control signal to the NFC chip in response to the second setting instruction. The NFC chip activates a second circuit part based on the second control signal, and functions as a second NFC module together with an NFC antenna to work in the card emulation mode.

In a specific implementation, the acquiring apparatus can work in a mode by default, and switch to another mode in response to a mode switching instruction of a merchant. Specifically, the acquiring apparatus can work in the card reader mode by default, that is, in a default state, the NFC chip activates the first circuit part to work. When the merchant determines that the card emulation mode needs to be used, the merchant sends a mode switching instruction by using the background control system. In response to the mode switching instruction, the controller in the acquiring apparatus sends a control signal indicating mode switching to the NFC chip, so that the NFC chip switches to the card emulation mode. The NFC chip returns to the default working mode after current payment is completed or after specific time. Alternatively, similarly, the NFC chip in the acquiring apparatus can work in the card emulation mode by default. When receiving the mode switching instruction sent by the merchant, the NFC chip switches to the card reader mode.

In an embodiment, the first setting instruction/second setting instruction/mode switching instruction can be input by a customer. Specifically, an acquiring system can provide an interaction interface for the customer to select and set a payment tool for use. In a specific example, the interaction interface can be specifically a touchscreen, where the touchscreen displays merchant acquiring information and an optional payment tool. The customer can confirm the merchant acquiring information, and select a payment tool to be used through a touch operation. If the customer selects a first NFC payment manner (including using a physical bank card or a virtual card), the acquiring apparatus receives the first setting instruction from the interaction interface, so that the NFC chip works in the card reader mode. If the customer selects a second NFC payment manner, the acquiring apparatus receives the second setting instruction from the interaction interface, so that the NFC chip works in the card emulation mode.

Alternatively, the NFC chip in the acquiring apparatus works in a mode by default. When a payment tool selected by the customer does not correspond to the default working mode, the acquiring apparatus receives the mode switching instruction, and enables, based on the instruction, the NFC chip to switch the working mode.

In an implementation, the acquiring apparatus can receive a setting instruction sent by a merchant by using the backend control system, and can also receive a setting instruction sent by a customer by using the interaction interface. In this case, in an embodiment, the acquiring apparatus does not distinguish between sources of the setting instructions, and sequentially executes the instructions based on receiving time. In another embodiment, the acquiring apparatus can set a higher priority for a source, for example setting a higher priority for a customer input, and preferentially waits for or processes an instruction with a higher priority.

For specific working manners and payment-related processing of the acquiring apparatus in the card reader mode and the card emulation mode, references can be made to the above-mentioned description provided with reference to the above-mentioned implementation. Details are not described herein again.

Embodiment 2

Although the above-mentioned implementation/embodiment provides a way for a customer to select a working mode of an acquiring apparatus, for example, touching different sensing areas, or manually selecting a payment manner, a customer may still confuse functions of two sensing areas or is not clear which mode should be used. Therefore, this specification further proposes some implementation in which the acquiring apparatus automatically switches a working mode. The following describes an implementation of automatic switching with reference to a specific example. To better describe technical details of the embodiments herein, an example in which a customer uses an intelligent terminal as a payment tool is used below for description. A case in which a customer uses another tool such as a physical NFC card as a payment tool can be derived by a person skilled in the art based on the following description, and therefore is not described again.

Figure 6A:
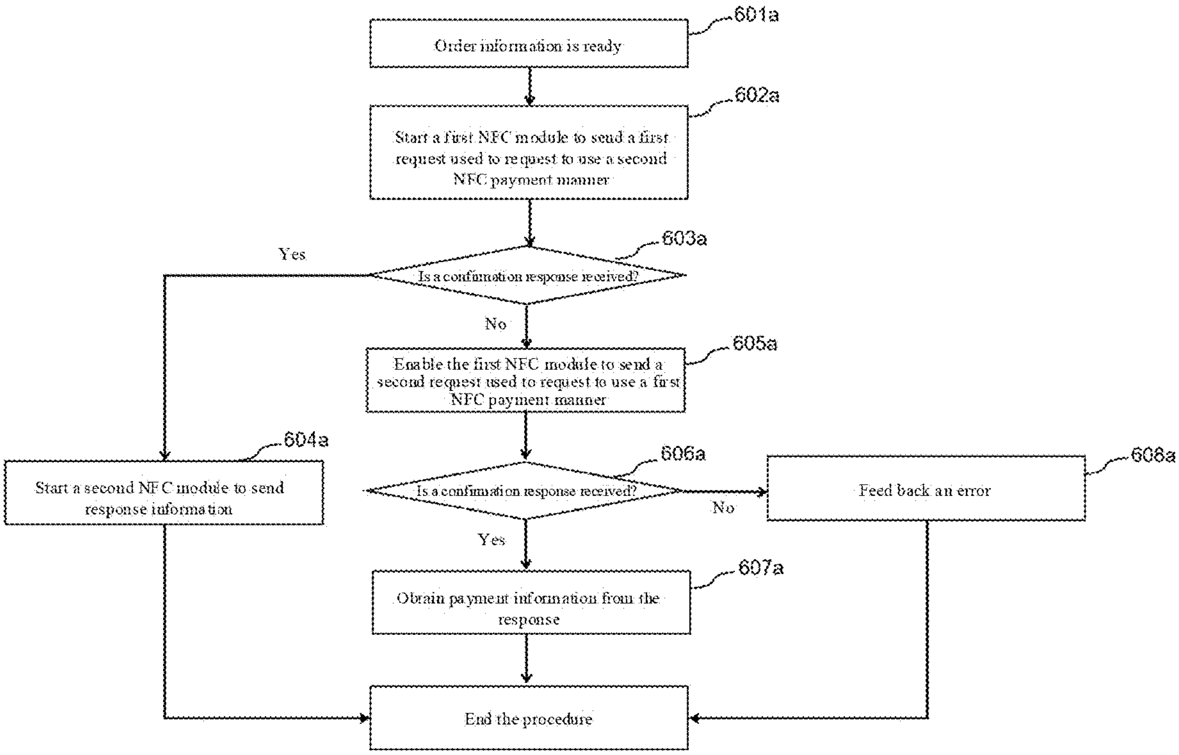
FIG. 6A shows a control processing procedure of an acquiring apparatus in an example.

FIG. 6A shows a control procedure of an acquiring apparatus in an example, and the example can be to as an example A. The control procedure in FIG. 6A can be executed by a controller in the acquiring apparatus. As shown in FIG. 6A, first, in step 601*a*, the acquiring apparatus determines that order information is ready. Specifically, a merchant may place an order by using a local or cloud backend system to determine the order information, or referred to as merchant acquiring information. In a self-service settlement scenario, a customer can determine the order information by operating an interaction page of an acquiring system. After the merchant or the customer determines the order information, a backend control system can send a message or an instruction to the acquiring apparatus, so that the acquiring apparatus determines that the order information is ready, and NFC payment can be started. Therefore, in step 602*a*, the acquiring apparatus first starts a first NFC module by default to send a first request used to request to use a second NFC payment manner. The first request can also be referred to as a request used to request to work as a second NFC module to complete payment. In this step, once the merchant/customer determines the order information and sends a ready state notification, the acquiring apparatus starts the first NFC module by default to work in a card reader mode. In this mode, the first NFC module can send a first radio frequency signal to form a first radio frequency field, send the first request by using the first radio frequency field, and attempt to detect response information. In an embodiment, the first NFC module can detect approaching of a sensing object by using an LPCD technology. After detecting that a sensing object is approaching, the first NFC module exits an LPCD mode, and starts to transmit the first radio frequency signal to send the first request.

In the example A, the first NFC module can include indication data in a predetermined format in the first request, and the indication data is used to specify to use the second NFC payment manner. In a specific implementation, the first request can be an APDU request, and a field of the APDU request includes the indication data. Specifically, the indication data can be, for example, in a form of an application identifier (AID), and is used to specify an application identifier of an application module that supports the second NFC payment manner (in other words, an application module that can interact with the second NFC module to complete payment). The application module can be a specific digital wallet application, or can be a specific service in a digital wallet application. In the example A, the AID is set to an AID of an application module M1 that supports the second NFC payment manner. It should be understood that, although the AID is used as an example for description in this example, the indication data can alternatively be in another format agreed between an acquiring system and an NFC service or an operating system of the intelligent terminal.

After the first NFC module sends the first request in step 602*a*, the intelligent terminal parses the first request by using the NFC service, and determines whether an application module that supports the second NFC payment manner is installed, for example, determines, by using the AID, whether the application module M1 is installed. If the application module M1 is installed, the intelligent terminal sends a confirmation response by using a radio frequency signal, and generally, the intelligent terminal further correspondingly starts the application module ML. If the application module M1 is not installed, the intelligent terminal sends an error response that includes an error code.

Correspondingly, in step 603*a*, it is determined whether a confirmation response for the first request is received. If the confirmation response is received, in step 604*a*, the controller starts the second NFC module, or switches a working mode of an NFC chip to a card emulation mode. In the card emulation mode, the second NFC module senses an external radio frequency signal and sends response information that includes merchant acquiring information, so that the intelligent terminal completes payment.

If it is determined in step 603*a* that the confirmation response is not received (which includes both a case in which an error response is received and a case in which no response is received (for example, a customer uses a physical card instead of an intelligent terminal to perform payment)), in step 605*a*, the first NFC module is enabled to send, by using a radio frequency signal, a second request used to request to use a first NFC payment manner. The second request can also be referred to as a request used to request to work in the card reader mode to complete payment. In the example A, the first NFC module can include indication data in a predetermined format in the second request, and the indication data is used to specify to use the first NFC payment manner. In a specific example, the second request can be a request (for example, SELECT PPSE) used to request information about an available payment application that supports the first NFC payment manner (in other words, an available application that can interact with the first NFC module to complete payment), or can be a request that includes an of an application module M2 that supports the first NFC payment manner (that is, an application module that can interact with the first NFC module to complete payment).

After parsing the second request by using the NFC service, the intelligent terminal performs an operation corresponding to request content. For example, when the second request is SELECT PPSE, the intelligent terminal determines whether there is an available payment application that supports the first NFC payment manner. If there are a plurality of available payment applications, the intelligent terminal prompts the customer to select a payment application from the plurality of available payment applications to perform payment, and after the customer completes the selection, provides payment information (or referred to as customer payment information, such as token information) of the selected payment application to the acquiring apparatus in a form of an APDU response. If there is only one available payment application, the intelligent terminal directly provides payment information of the payment application to the acquiring apparatus in a form of an APDU response. If there is no available payment application, the intelligent terminal sends an APDU response including an error code to the acquiring apparatus.

When the second request specifies the AID of the application module M2 that supports the first NFC payment manner, the intelligent terminal can determine whether the application module M2 is installed. If the application module M2 is installed, the intelligent terminal directly provides payment information of the application module M2 to the acquiring apparatus in a form of an APDU response. If the application module M2 is not installed, the intelligent terminal sends an APDU response including an error code to the acquiring apparatus.

Next, in step 606*a*, it is determined whether a confirmation response for the second request is received. If the first NFC module receives an APDU response that includes customer payment information, it is determined that the confirmation response is received, proceed to step 607*a* to obtain the customer payment information from the response and correspondingly complete a payment procedure. If the first NFC module receives an APDU response including an error code or does not receive any response at all, it is determined that the confirmation response is not received, proceed to step 608*a* to fed back an error to the merchant and correspondingly end the procedure.

Optionally, if an error code is received or no response is received in step 606*a* after the first NFC module sends the second request, it means that a digital wallet component that supports NFC payment is not installed in the intelligent terminal. In an optional implementation, in step 608*a*, the first NFC module is enabled to further send, by using a radio frequency signal, a third request used to guide the customer to complete payment. In a specific example, the third request can include the following URL: The URL points to a resource for payment by using a page, or points to a resource used to download a component (for example, a specific digital wallet) required to enable the intelligent terminal to support NFC payment. In this way, after parsing the third request to obtain the URL, the intelligent terminal enters a browser page or an H5 page by using the URL, and inputs information for payment in a traditional manner. Alternatively, the intelligent terminal (after confirmation by the customer) obtains the above-mentioned component by using the URL, and then attempts to perform NFC payment after installing the component.

In the example A, after the order information is determined, the acquiring apparatus actively sends a request by using the first NFC module, where the request specifies to preferentially use the second NFC payment manner. After receiving a valid response, the acquiring apparatus starts the second NFC module, switches to the card emulation mode, and performs payment in the second NFC payment manner.

Figure 6B:
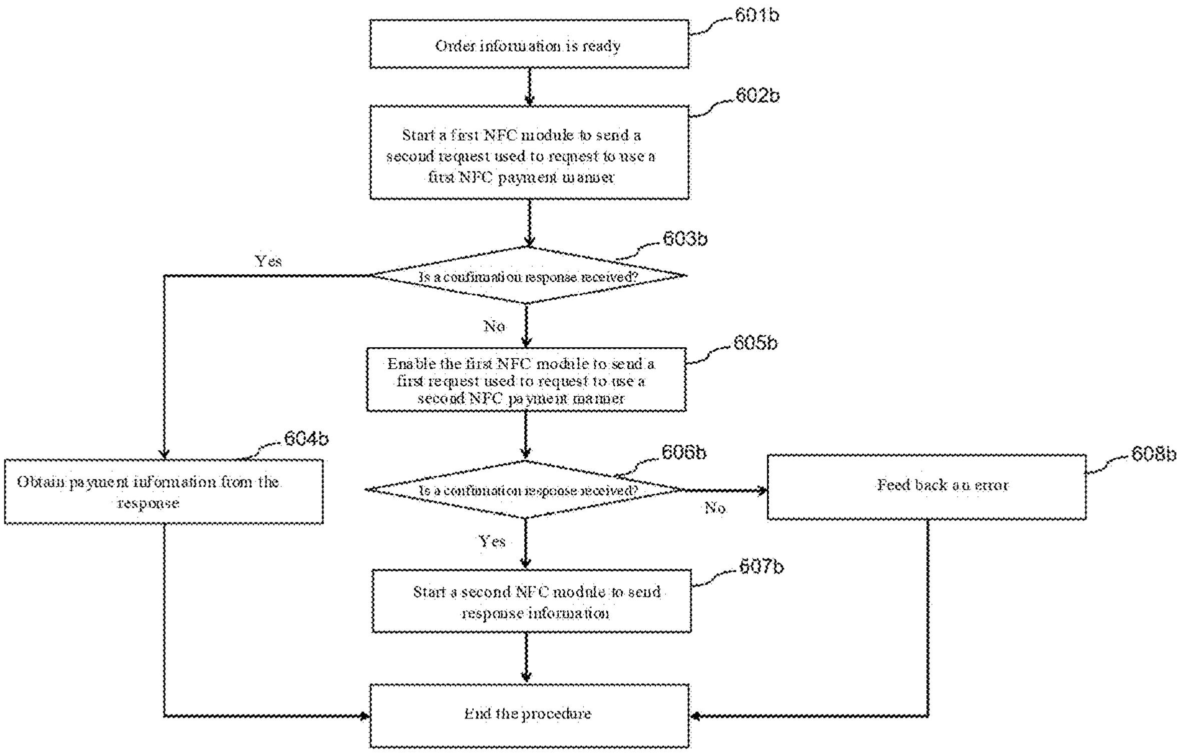
FIG. 6B shows a control processing procedure of an acquiring apparatus in another example.

FIG. 6B shows a control procedure of an acquiring apparatus in another example, and the example can be to as an example B. Parts in FIG. 6B that are similar to those in FIG. 6A are merely briefly described. As shown in FIG. 6B, first, in step 601*b*, the acquiring apparatus determines that order information is ready. Then, in step 602*b*, a first NFC module is started by default to send a second request used to request to use a first NFC payment manner. For the second request and an operation performed by the intelligent terminal after the second request is received, references can be made to the example A. Details are not described herein again.

In step 603*b*, it is determined whether a confirmation response for the second request is received. If it is determined that the confirmation response is received, proceed to step 604*b*, and the first NFC module obtains customer payment information from the response and correspondingly completes a payment procedure. If it is determined that the confirmation response is not received, proceed to step 605*b* to enable the first NFC module to send, by using a radio frequency signal, a first request used to request to use a second NFC payment manner. For the first request and an operation performed by the intelligent terminal after the first request is received, references can be made to the example A. Details are not described herein again.

In step 606*b*, it is determined whether a confirmation response for the first request is received. If it is determined that the confirmation response is received, proceed to step 607*b*, and a controller starts a second NFC module, or switches a working mode of an NFC chip to a card emulation mode. In the card emulation mode, the second NFC module senses an external radio frequency signal and sends response information that includes merchant acquiring information, so that the intelligent terminal completes payment. If it is determined that the confirmation response is not received, proceed to step 608*b* to fed back an error to a merchant and correspondingly end the procedure. Similarly, in step 608*b*, the first NFC module is enabled to further send, by using a radio frequency signal, a third request used to guide the customer to complete payment.

In the example B, after the order information, the acquiring apparatus actively sends a request by using the first NFC module, where the request specifies to preferentially use the first NFC payment manner. After receiving a valid response, the first NFC module reads payment information and performs payment in the first NFC payment manner.

Figure 6C:
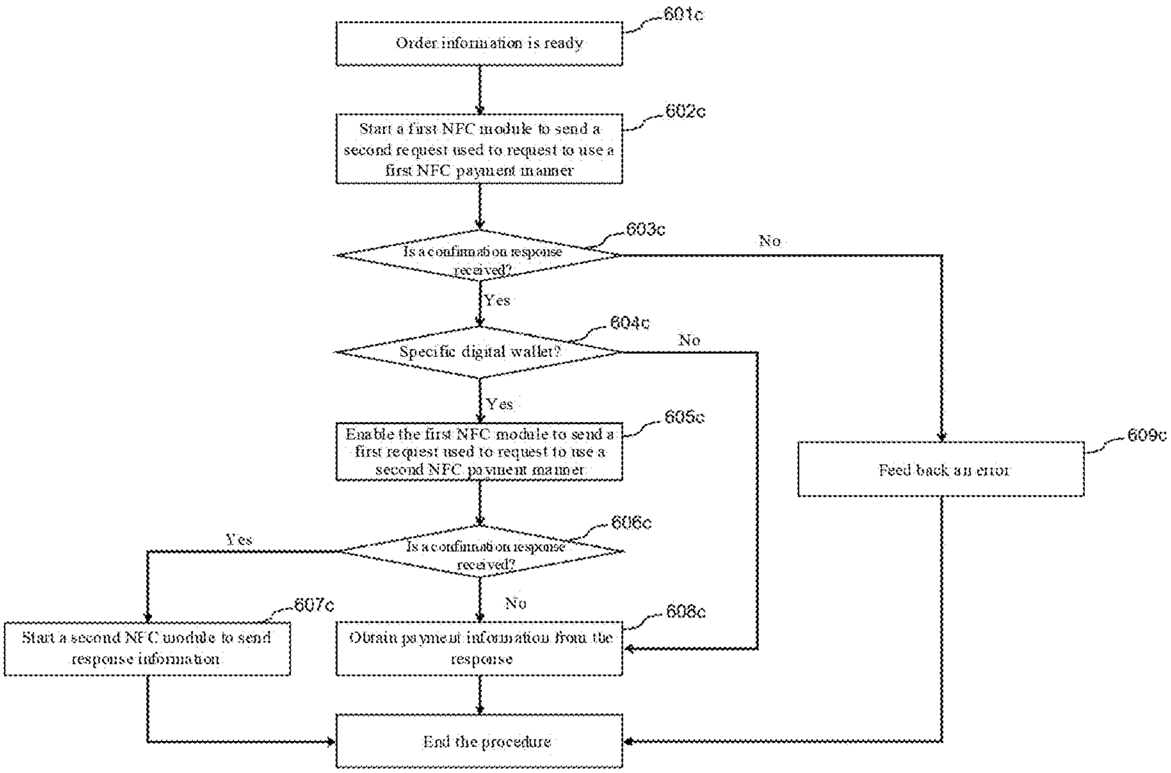
FIG. 6C shows a control processing procedure of an acquiring apparatus in still another example.

FIG. 6C shows a control procedure of an acquiring apparatus in still another example, and the example can be to as an example C. In the example C, considering that only specific digital wallets can support a second NFC payment manner and that these digital wallets also support a first NFC payment manner, it is configured to request to use the second NFC payment manner after it is determined that a customer is using the specific digital wallet.

As shown in FIG. 6C, first, in step 601*c*, the acquiring apparatus determines that order information is ready. Then, in step 602*c*, a first NFC module is started to send a second request used to request to use the first NFC payment manner. For the second request and an operation performed by the intelligent terminal after the second request is received, references can be made to the example A. Details are not described herein again.

In step 603*c*, it is determined whether a confirmation response for the second request is received. If it is determined that the confirmation response is received, proceed to step 604*c* to determine whether a payment manner used by the customer is the specific digital wallet. Specifically, as described above, this can be determined based on an APDU response sent from the intelligent terminal. In a specific example, whether the payment manner used by the customer is the specific digital wallet can be determined based on whether the APDU response includes an AID of the specific digital wallet. If it is determined that the payment manner is not the specific digital wallet, the second NFC payment manner cannot be used, proceed to step 608, and the first NFC module obtains customer payment information from the response and completes a payment procedure in the first NFC payment manner.

If it is determined that the payment manner is the specific digital wallet, proceed to step 605*c* to enable the first NFC module to send, by using a radio frequency signal, a first request used to request to use a second NFC payment manner. For the first request and an operation performed by the intelligent terminal after the first request is received, references can be made to the example A. Details are not described herein again. In step 606*c*, it is determined whether a confirmation response for the first request is received. If it is determined that the confirmation response is received, proceed to step 607*c*, and a controller starts a second NFC module, or switches a working mode of an NFC chip to a card emulation mode. In the card emulation mode, the second NFC module senses an external radio frequency signal and sends response information that includes merchant acquiring information, to complete payment in the second NFC payment manner. If it is determined that the confirmation response is not received, proceed to step 608*c*. As described above, the first NFC module obtains the customer payment information from the response received in step 603*c*, and completes the payment procedure in the first NFC payment manner.

If it is determined in step 603*c* that the confirmation response for the second request is not received, proceed to step 609*c* to fed back an error to a merchant and correspondingly end the procedure. Similarly, in step 609*c*, the first NFC module is enabled to further send, by using a radio frequency signal, a third request used to guide the customer to complete payment.

In the example C described above, the acquiring apparatus attempts to request to use the second NFC payment manner after determining that the customer uses the specific digital wallet.

The example A, example B, and example C described above are only some examples in which the acquiring apparatus interacts with the intelligent terminal to automatically determine a working mode, and this specification is not limited thereto. Factors such as an available payment manner, a preference of a user, and a preference of a merchant can be considered, to set a procedure of interaction between the acquiring apparatus and the intelligent terminal in any appropriate manner, and determine an appropriate working mode. In other embodiments, the above-mentioned example procedure can be modified and/or replaced.

In the plurality of above-mentioned examples, the acquiring apparatus can implement a function of automatically switching between the card reader mode and the card emulation mode based on a payment tool used by a customer.

Embodiment 3

In another embodiment of this specification, a magnetic field sensor can be deployed in an acquiring apparatus. The acquiring apparatus automatically switches between different working modes based on a change that is of a magnetic field around the acquiring apparatus and that is sensed by the magnetic field sensor.

Specifically, as a sensing device, the acquiring apparatus may generate a magnetic field, and the earth may also have a magnetic field, which has a corresponding influence on the sensing device (magnetic field strength of the earth's environment is usually tens of micro Tesla). Generally, both the magnetic fields are relatively stable. However, if a sensing object is approaching, an obvious magnetic field change may occur. The sensing object, such as an intelligent terminal that includes a speaker and some electronic components, may have a relatively strong magnetic field, which generally ranges from dozens to hundreds of micro Tesla. Using a common smartphone as an example, magnetic field strength of the smartphone can usually reach hundreds of micro Tesla. Compared with the mobile phone, a passive sensing object such as an IC card have significantly low magnetic field strength. For example, IC cards such as a door access card, a bank card, and a bus card that are commonly used on the market usually have magnetic field strength with unit's digit of micro Tesla. In this case, a mobile phone or an IC card suddenly approaches the magnetic field sensor may correspondingly bring about a change in magnetic field strength of ten's digit or unit's digit to the sensor. Further, because a radio frequency signal needs to be continuously transmitted, a magnetic field strength change caused by an intelligent terminal working in a card reader mode is significantly greater than a magnetic field strength change caused by an intelligent terminal working in a card emulation mode.

Based on the above-mentioned analysis, it can be inferred, based on an amplitude of a magnetic field strength change reflected by magnetic field data, whether a sensing object currently approaches the acquiring apparatus, and it can be further inferred whether the approaching sensing object is an intelligent terminal in the card reader mode, an NFC card, or an intelligent terminal in the card emulation mode. If the magnetic field data detected by the magnetic field sensor reflects a small magnetic field change, for example, the amplitude of the magnetic field strength change is less than a first threshold, it can be inferred that the sensing object is the NFC card or the intelligent terminal in the card emulation mode. Therefore, a controller in the acquiring apparatus can start a first NFC module, so that the acquiring apparatus works in the card reader mode to perform payment is in a first NFC payment manner. In another aspect, if the magnetic field change is relatively large, for example, the amplitude of the magnetic field strength change is greater than a second threshold (the second threshold is greater than the first threshold), it can be inferred that the sensing object is the intelligent terminal in the card reader mode. Therefore, the controller in the acquiring apparatus can start a second NFC module, switch the acquiring apparatus to the card emulation mode to communicate with the intelligent terminal, and perform payment in a second NFC payment manner.

Figure 7:
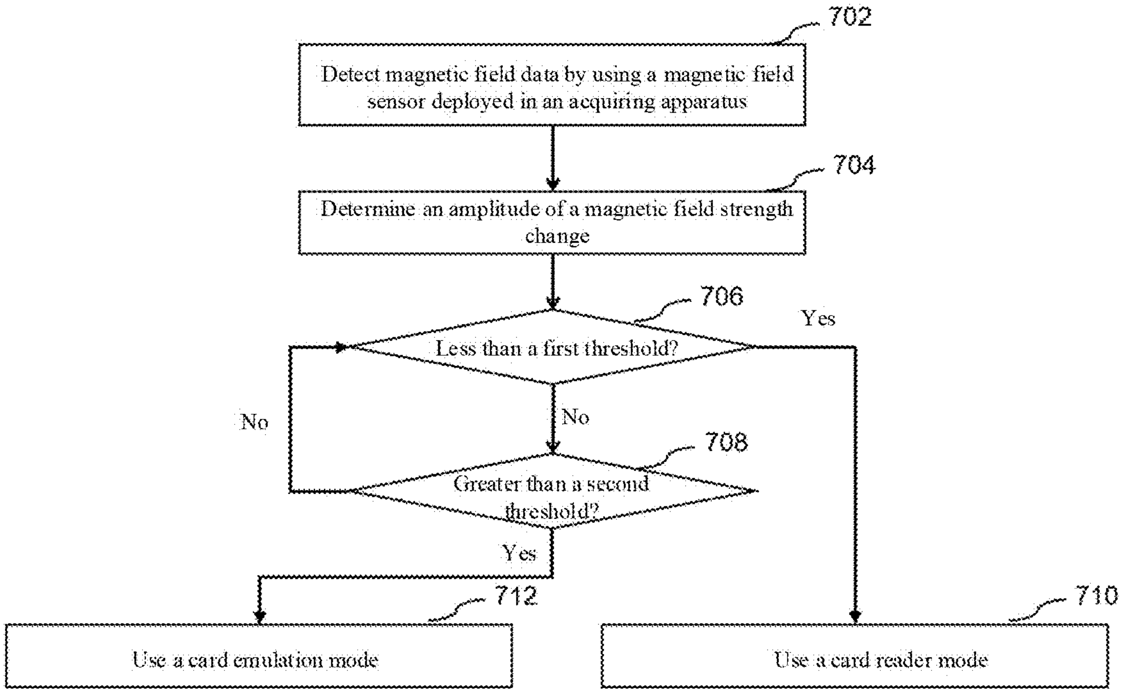
FIG. 7 is a flowchart of a method for switching a working mode of an acquiring apparatus according to an embodiment of this specification.

FIG. 7 is a flowchart of a method for switching a working mode of an acquiring apparatus according to this embodiment. The control procedure in FIG. 7 can be performed by a controller in the acquiring apparatus.

In step 702, magnetic field data is detected by using a magnetic field sensor deployed in the acquiring apparatus.

One or more magnetic field sensors can be deployed in the acquiring apparatus. When there are a plurality of magnetic field sensors, the magnetic field sensors can be deployed in a decentralized manner, so that the magnetic field data is more reliably and completely detected. Magnetic field data of the plurality of magnetic field sensors can be fused, or magnetic field data of a magnetic field sensor can be selected, etc. The magnetic field data can include magnetic field strength (a magnetic field direction can be further considered if necessary), for example, can specifically include distribution data of the magnetic field strength in a time dimension and/or a space dimension.

In step 704, an amplitude of a magnetic field strength change is determined based on the magnetic field data detected by the magnetic field sensor. In step 706, it is determined whether the amplitude of the magnetic field strength change is less than a first threshold. If yes, proceed to step 710, and it is inferred that a sensing object is an NFC card or an intelligent terminal in a card emulation mode. Therefore, the acquiring apparatus is set to the card reader working mode, or in other words, a first NFC module is enabled to work to cooperate with the sensing object to complete payment in a first NFC payment manner.

If it is determined that the amplitude of the magnetic field strength change is not less than the first threshold, proceed to step 708 to further determine whether the amplitude of the magnetic field strength change is greater than a second threshold. If yes, proceed to step 712 to infer that a sensing object is an intelligent terminal in a card reader mode. Therefore, the acquiring apparatus is set to a card emulation working mode, or in other words, a second NFC module is enabled to work to cooperate with the sensing object to complete payment in a second NFC payment manner. If it is determined that the amplitude of the magnetic field strength change is not greater than the second threshold, return to step S706 to continuously monitor whether the amplitude of the magnetic field strength change is less than the first threshold or greater than the second threshold.

A specific manner of calculating an amplitude of a magnetic field strength change of a determining object can be determined based on an actual payment manner in each market. This is not limited in this specification. In a specific example, if a large quantity of intelligent terminals in a market support both the first NFC payment manner and the second NFC payment manner, an intelligent terminal in the card reader mode and an intelligent terminal in the card emulation mode need to be accurately distinguished. In this case, an average value of the amplitudes of the magnetic field strength change detected by the magnetic field sensor in a relatively long period can be selected as a determining object in step 704, to mitigate interference caused by a large-scale strength change that is caused in a short time by the intelligent terminal in the card emulation mode approaching the acquiring device. Optionally, a large-scale strength change caused by a sensing object approaching the acquiring device can be further excluded from a calculation range of the average value of the amplitudes of the magnetic field strength change, to accurately identify the intelligent terminal in the card reader mode. In contrast, if most intelligent terminals in a market support only the second NFC payment manner, a large-scale strength change caused in a short time by the intelligent terminal approaching the acquiring device can be used as the determining object in step 704, that is, proceed to step 712 provided that it is determined that the magnetic field strength change exceeds a predetermined amplitude, to start a payment procedure in the second NFC payment manner.

In addition, the first threshold and the second threshold can be determined based on experimental data of mainstream intelligent terminals in each market, and a manner of determining the first threshold and the second threshold is not limited in this specification. In addition, to improve identification accuracy, both the first threshold and the second threshold are set in the above-mentioned embodiment, and a working mode of the acquiring apparatus is determined only when the amplitude of the magnetic field strength change is less than the first threshold is or greater than the second threshold. However, a person skilled in the art understands that this specification is not limited thereto, and only one threshold can be set. In other words, the first threshold can be the same as the second threshold, and the operating mode of the acquiring apparatus is determined based on a relationship between the amplitude of the magnetic field strength change and the threshold. Optionally, if the first NFC payment manner occupies the mainstream in a market, only a relatively large threshold can be set. In addition, the acquiring apparatus is enabled to work in the card emulation mode only when the amplitude of the magnetic field strength change is greater than the threshold, and in other cases, the acquiring apparatus is enabled to work in the card reader mode. In contrast, if the second NFC payment manner occupies the mainstream in a market, only a relatively small threshold can be set. In addition, the acquiring apparatus is enabled to work in the card reader mode only when the amplitude of the magnetic field strength change is less than the threshold, and in other cases, the acquiring apparatus is enabled to work in the card emulation mode.

Similarly, an attempt can be made to identify another sensing object other the various sensing objects listed above by using different impact on a magnetic field change, so that the acquiring apparatus performs sensing and interaction by using an appropriate working mode.

Optionally, before a specific working mode is determined based on the magnetic field strength change, an original magnetic field can first be kept in a relatively stable state, so that the magnetic field change caused by approaching of a sensing object can be more reliably and accurately determined by using the stable state as a reference.

Based on this, an ambient magnetic field strength value can be determined by performing magnetic field self-test in advance, so that a magnetic field change is subsequently determined by using the ambient magnetic field strength value as a reference. In a specific example, the magnetic field self-test can include the following steps: initializing the ambient magnetic field strength value; determining a current magnetic field strength value based on magnetic field data, and comparing the current magnetic field strength value with the ambient magnetic field strength value; if a difference between the ambient magnetic field strength value and the current magnetic field strength value is large enough, repeatedly determining the current magnetic field strength value, to detect whether the current magnetic field strength value is stable enough; and if the current magnetic field strength value is stable enough, updating the ambient magnetic field strength value to the current magnetic field strength value. The ambient magnetic field strength value can be initialized to a relatively small value (for example, 0 or a relatively typical earth magnetic field value). If the difference between the ambient magnetic field strength value and the current magnetic field strength value is large enough, it indicates that the initialized ambient magnetic field strength value may be excessively small to meet a real situation. The real situation can be obtained by detecting the current magnetic field strength value a plurality of times, and therefore, the ambient magnetic field strength value can be updated by using a stable current magnetic field strength value.

Further, when it is detected whether the current magnetic field strength value is stable enough, the current magnetic field strength value needs to be detected a plurality of times, and the current magnetic field strength value that is used as the reference can be dynamically determined, so that a stable hold time is dynamically re-recorded by using a new reference until an expectation is achieved, thereby helping more reliably measure stability. In a specific example, if the difference between the ambient magnetic field strength value and the current magnetic field strength value is large enough, the current magnetic field strength value obtained before re-determining can be used as a previously updated magnetic field strength value, and corresponding previous update time is recorded. The current magnetic field strength value is re-determined, and it is determined whether a difference between the re-determined current magnetic field strength value and the previously updated magnetic field strength value is large enough. If the difference between the re-determined current magnetic field strength value and the previously updated magnetic field strength value is not large enough, and a difference between current time and the previous update time is large enough, it is determined that the current magnetic field strength value is stable enough. If the difference between the re-determined current magnetic field strength value and the previously updated magnetic field strength value is large enough, the previously updated magnetic field strength value is updated to the re-determined current magnetic field strength value, the previous update time is updated to the current time, and the current magnetic field strength value continues to be re-determined.

It should be noted that before the magnetic field self-test is performed, it can be first determined that there is no sensing object around the acquiring apparatus, to avoid affecting a magnetic field self-test result. Optionally, a time of flight (TOF) distance sensor can be deployed on or near the acquiring apparatus to detect distance data, and it is determined, based on the distance data, whether a sensing object is currently around the current acquiring apparatus, to perform the magnetic field self-test when there is no object. Similarly, whether the acquiring apparatus is in a moving state can be determined first. If the acquiring apparatus is moving, reliability of the magnetic field self-test result is also affected. Optionally, an angular velocity sensor can be deployed on or near the acquiring apparatus to detect angular velocity data, and it is determined, based on the angular velocity data, whether the acquiring apparatus is currently in a moving state, to perform magnetic field self-test if it is determined that the acquiring apparatus is not in the moving state.

When a distance sensor and/or an angular velocity sensor are/is deployed on or near the acquiring apparatus, optionally, before the control procedure in FIG. 7 is started, it can be first determined, by using the angular velocity sensor, that a sensing device is not currently in a moving state, and then the procedure is started; and/or it can be first determined, by using the distance sensor, that a sensing object is currently approaching the acquiring apparatus, and then the procedure is started. In this way, it can be ensured that a magnetic field change is caused by an approaching sensing object, so that a subsequent determining result is more reliable.

In the above-mentioned manner, the acquiring apparatus switches between the card reader mode and the card emulation mode by using the magnetic field strength change around the acquiring apparatus as a condition, to automatically adapt to an approaching sensing object to implement payment processing.

Embodiment 4

Figure 8A:
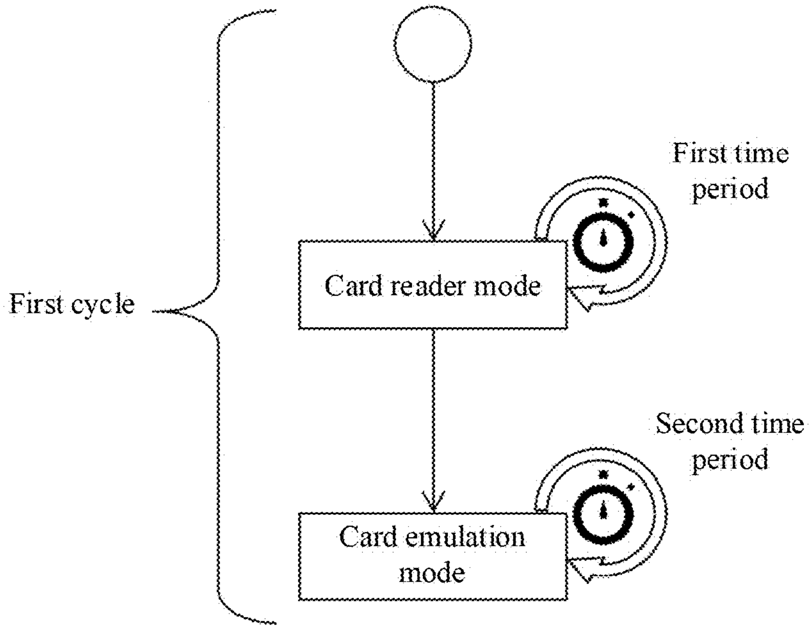
FIG. 8A is a flowchart of a method for switching a working mode of an acquiring apparatus according to an embodiment of this specification.

In an implementation, a controller in the acquiring apparatus automatically switches between two working modes by using a time period as a segmentation reference. Specifically, the controller in the acquiring apparatus can cyclically perform mode switching based on a cycle T (referred to as a first cycle below). During a first time period of the first cycle, the controller activates or starts a first NFC module, so that the acquiring apparatus works in a card reader mode. During a second time period of the first cycle, the controller activates or starts a second NFC module, so that the acquiring apparatus operates in a card emulation mode. FIG. 8A is a flowchart of a method according to this embodiment.

Referring to FIG. 8A, in the first time period, the acquiring apparatus starts the first NFC module to work in the card reader mode, transmits a first radio frequency signal to form a first radio frequency field, and detects whether first response information is received. In some scenarios, the first radio frequency signal transmitted by the first NFC module is only used to construct a radio frequency field, and does not carry a communication request or command data. When a sensing object used for payment (for example, an NFC bank card or a smartphone in the card emulation mode) continuously approaches the acquiring apparatus to enter the radio frequency field, the sensing object in the radio frequency field can obtain, by using an oscillator circuit (usually including an inductor and a capacitor) inside the sensing object, radio frequency field energy to generate an induced current. The induced current can drive a communications chip in the sensing object to send the first response information, and the first NFC module can capture the response information. In some other scenarios, the first NFC module can modulate a first communication request into the radio frequency signal, and transmit the radio frequency signal to generate the first radio frequency field. A sensing object that is in the first radio frequency field and that is used for payment drives a communication chip of the sensing object by using an induced current, demodulates the sensed radio frequency signal to obtain the first communication request, and generates and transmits corresponding first response information for the first communication request, and the first NFC module can capture the response information.

Still referring to the accompanying drawing, in the second time period, the acquiring apparatus starts the second NFC module to work in the card emulation mode, and continuously detects whether a second radio frequency signal is received. In some scenarios, the second radio frequency signal can be a radio frequency signal transmitted by an external sensing object without a specific communication request. After receiving the radio frequency signal, the second NFC module drives an NFC chip of the second NFC module to send response information, where the response information can be general response information (for example, handshake information or preset merchant acquiring information). In some other scenarios, the second radio frequency signal can alternatively be a radio frequency signal that is sent by an external sensing object through modulation and that carries a specific communication request, and the second NFC module drives the NFC chip of the second NFC module to send response information (which usually includes merchant acquiring information) to respond to the communication request.

The above-mentioned embodiment can be repeatedly performed. In other words, the method is cyclically performed based on the first cycle, and the acquiring apparatus continuously switches between the two working modes to continuously detect or respond to a sensing object approaching the acquiring apparatus.

In the above-mentioned embodiment, the first time period and the second time period can be set to time periods with an equal length, or can be customized based on a specific communication requirement and a signal response sensitivity requirement.

In an implementation, duration of the first time period is greater than duration of the second time period. After transmitting a radio frequency signal, the acquiring apparatus working in the card reader mode needs to reserve a specific time to wait for a sensing object to return response information. In contrast, the acquiring apparatus working in the card emulation mode only needs to directly detect whether a radio frequency signal transmitted by another sensing object exists. Therefore, in this implementation, a time period (the first time period) allocated to the acquiring apparatus to work in the card reader mode can be longer than a time period (the second time period) in which the acquiring apparatus works in the card emulation mode. In a specific example, the first time period can be set to 500 ms, and the second time period can be set to 100 ms.

It should be noted that, generally, near field communication is characterized by a short communication distance and a fast communication response speed. Therefore, a time period used to trigger working mode switching can be precisely set at a millisecond level, but this does not represent a strict limitation on setting of the time period. Based on a difference in a near field communication technology used in a specific application scenario, the time period can be flexibly set based on an actual requirement. In some cases, a longer time period may be required to ensure communication stability and reliability. However, in some cases, a shorter time period may be required to implement a faster response speed to optimize customer experience.

Figure 8B:
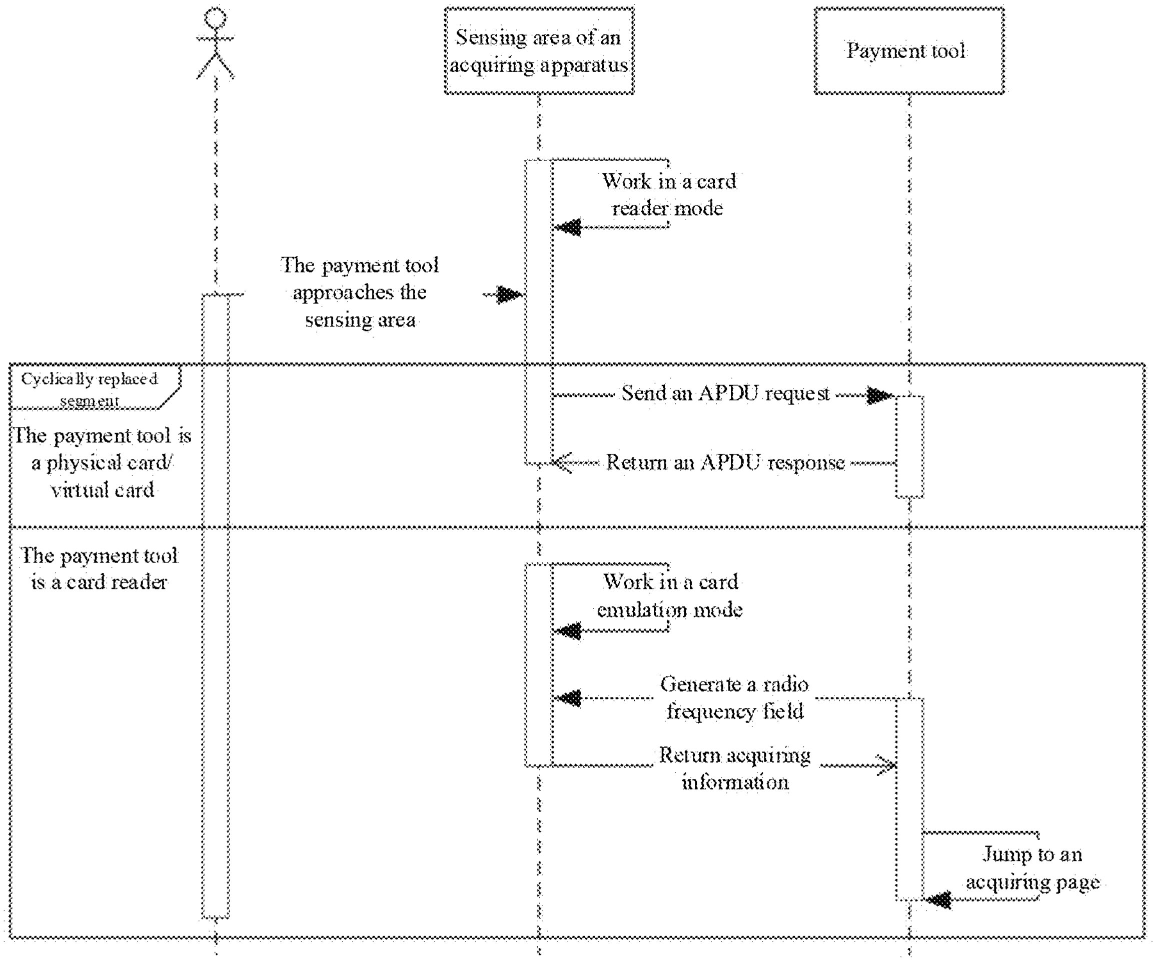
FIG. 8B is a diagram of a transaction processing procedure according to an embodiment.

To describe the implementation more clearly, FIG. 8B is a diagram of a transaction processing procedure according to an embodiment. A merchant orders a transaction, and transmits related acquiring information to an acquiring apparatus (the acquiring information can be input by the merchant on the acquiring apparatus, or can be obtained by the acquiring apparatus from a server). In this case, a customer can start to perform payment, and a payment manner is determined by the customer. The customer places a payment tool approaching or touching a sensing area of the acquiring apparatus. The acquiring apparatus can automatically switch, based on the payment manner selected by the customer, to a corresponding working mode for NFC interaction.

Referring to FIG. 8B, the acquiring apparatus can preferentially work in a card reader mode, to actively capture another approaching sensing object and actively evoke an acquiring procedure. When the customer holds the payment tool approaching or touching the sensing area of the acquiring apparatus, the acquiring apparatus attempts to read payment information of the payment tool in the card reader mode. In this case, the acquiring apparatus continuously attempts to send an APDU request; and if an APDU response from the payment tool is successfully captured, the acquiring apparatus can complete the transaction based on card information encapsulated in the response message.

If the acquiring apparatus fails to capture response information from another sensing object within a specified time, the acquiring apparatus switches to a card emulation mode to be activated by a radio frequency field of the another sensing object. After the acquiring apparatus is activated by a radio frequency field of the payment tool, the acquiring apparatus returns a response message that includes acquiring information to the payment tool. In this scenario, the payment tool can be an intelligent terminal that has an NFC card reader function, and the payment tool can jump to a corresponding acquiring page (which can alternatively be a corresponding payment application in some examples)

based on the received acquiring information, and display the acquiring information to the customer to complete the transaction.

In another implementation of this implementation, the first time period and the second time period can be customized based on a time window and a service requirement. For example, from 9:00 to 19:00 per day, the acquiring apparatus needs to serve as a card reading POS machine. In this case, the acquiring apparatus needs to be in the card reader mode to process service communication. From 19:00 to 9:00 the next day, the acquiring apparatus needs to be identified as a collection/payment tag by another reading device. In this case, the acquiring apparatus should be in the card emulation mode. Therefore, the first time period can be correspondingly set to be from 9:00 to 19:00, to ensure that the acquiring apparatus can operate efficiently as the card reading POS machine during this period, and the second time period can be set to be from 19:00 to 9:00 on the next day, to meet a requirement of being read as the collection/payment tag (emulated card) during this period.

It is learned from the above-mentioned description that, the acquiring apparatus can automatically switch a working mode in different conditions, corresponding to various working modes, the acquiring apparatus can transmit a radio frequency signal to form a radio frequency field, to sense corresponding response information; or detect, in real time, a radio frequency signal sent by another sensing object.

In an implementation, the acquiring apparatus can stop execution in a current cycle (the first cycle) before performing payment-related target processing; and starts execution in a next cycle after payment processing is completed. In this implementation, the acquiring apparatus performs payment processing by using an exclusive policy. During acquiring processing, the acquiring apparatus does not respond even if another sensing object that performs payment approaches the acquiring apparatus. After the payment processing is completed, the acquiring apparatus continues to switch the working mode based on the first cycle.

In another embodiment, the acquiring apparatus can perform payment processing by using a parallel policy. During acquiring processing, the acquiring apparatus can switch the working mode based on the first cycle, to continue to respond to another sensing object approaching the acquiring apparatus, so that a full-duplex communication response can be implemented.

It should be noted that, in one or more embodiments of this specification, the control method for the acquiring apparatus that can be performed by the controller in the acquiring apparatus is described. The controller can be a controller in an intelligent device (for example, a smartphone or an intelligent terminal) that serves as the acquiring apparatus by running an acquiring application, or can be a dedicated controller in the acquiring apparatus that is used as dedicated hardware. The controller is not limited to a separate control chip, and can include a plurality of control chips distributed in the acquiring apparatus, and can further include some circuits in the NFC chip. A specific form of the controller is not limited in this specification.

A new acquiring apparatus and a control method therefor are described above in one or more embodiments. According to the acquiring apparatus and the control method therefore provided in the embodiments of this specification, the acquiring apparatus can support both a card reader working mode and a card emulation working mode. In this way, a same acquiring apparatus not only can serve as a card reader to read a physical card/emulated card to complete payment, but also can serve as an NFC card or an NFC tag to be read by an intelligent device a card reader to read to perform payment. This greatly improves near field communication compatibility of the acquiring apparatus, and helps improve customer experience in a payment scenario.

The acquiring apparatus and the control method therefor provided in the embodiments of this specification are described above. Based on a same idea, this specification further provides a control apparatus in an acquiring apparatus. In an embodiment, the control apparatus can be implemented as a hardware circuit. In another implementation, the control apparatus can be implemented as acquiring software installed in an intelligent terminal. In this case, control logic of the control apparatus can be implemented by using a software program.

Figure 9:
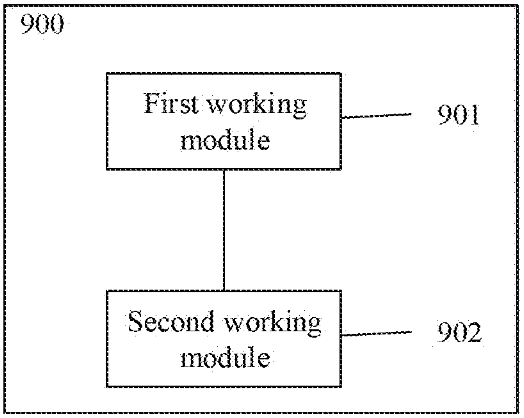
FIG. 9 is a schematic diagram of a control apparatus in an acquiring apparatus according to an embodiment of this specification.

FIG. 9 is a schematic diagram of a logical structure of a control apparatus in an acquiring apparatus. As shown in the figure, the control apparatus includes:

a first working module 901, configured to enable, in a first condition, a first NFC module to work in a card reader mode, to transmit a first radio frequency signal, detect first response information, and obtain customer payment information from the first response information; and a second working module 902, configured to enable, in a second condition, a second NFC module to work in a card emulation mode, to send second response information including merchant acquiring information in response to sensing a second radio frequency signal.

The first working module 901 can cooperate with the second working module 902 to complete all or some of the steps of the above-mentioned control method for the acquiring apparatus. Repeated description is omitted herein.

It should be further noted that in this specification, "first" in words such as the first condition and the first time period, and corresponding "second" and "third" (if exist) in this specification are merely intended to facilitate distinguishing and description, and do not have any limiting meaning.

The above-mentioned content describes specific embodiments of this specification, and other embodiments are within the scope of the appended claims. In some cases, the actions or steps described in the claims can be performed in an order different from the order in the embodiments and the desired results can still be achieved. In addition, the process depicted in the accompanying drawings does not necessarily need the shown particular order or consecutive order to achieve the desired results. In some implementations, multitasking and concurrent processing is feasible or can be advantageous.

A person skilled in the art should be aware that in the above-mentioned one or more examples, functions described in the embodiments of present invention can be implemented by hardware, software, firmware, or any combination thereof. When implemented by software, the functions can be stored in a computer-readable medium or transmitted as one or more instructions or code in the computer-readable medium.

The objectives, technical solutions, and beneficial effects of the embodiments of the present invention are further described in detail in the above-mentioned specific implementations. It should be understood that the above-mentioned descriptions are merely specific implementations of the embodiments of the present invention, but are not intended to limit the protection scope of the present invention. Any modification, equivalent replacement, or improvement made based on the technical solutions of the present invention shall fall within the protection scope of the present invention.

What is claimed is:

1. An acquiring apparatus, comprising:

a controller;

a first near field communication (NFC) module; and a second NFC module, wherein:

the first NFC module and the second NFC module work under control of the controller;

the first NFC module is configured to work in a card reader mode, and in the card reader mode, the first NFC module is configured to transmit a first radio frequency signal to a first device, detect first response information from the first device, and obtain customer information based on the first response information; and the second NFC module is configured to work in a card emulation mode, and in the card emulation mode, the second NFC module is configured to sense a second radio frequency signal from a second device, and send second response information comprising merchant acquiring information in response to sensing the second radio frequency signal.

2. The acquiring apparatus according to claim 1, wherein the first NFC module and the second NFC module are physical modules independent of each other;

the first NFC module is disposed at a first position corresponding to a first sensing area of the acquiring apparatus, and comprises a first NFC chip and a first NFC antenna; and the second NFC module is disposed at a second position corresponding to a second sensing area of the acquiring apparatus, and comprises a second NFC chip and a second NFC antenna.

3. The acquiring apparatus according to claim 2, wherein the controller is configured to enable, in response to receiving an acquiring instruction, the first NFC module and the second NFC module to work simultaneously.

4. The acquiring apparatus according to claim 2, wherein the second NFC module is configured to:

in response to sensing the second radio frequency signal, determine whether the second radio frequency signal is the first radio frequency signal transmitted by the first NFC module; and send the second response information if it is determined that the second radio frequency signal is not the first radio frequency signal transmitted by the first NFC module.

5. The acquiring apparatus according to claim 1, wherein the first NFC module and the second NFC module are implemented by a same NFC module, and the same NFC module works as the first NFC module or the second NFC module based on a control signal of the controller.

6. The acquiring apparatus according to claim 5, wherein the controller is configured to:

send a first control signal to the same NFC module in response to receiving a first setting instruction; and send a second control signal to the same NFC module in response to receiving a second setting instruction; and the same NFC module is configured to:

work as the first NFC module in response to receiving the first control signal; and work as the second NFC module in response to receiving the second control signal.

7. The acquiring apparatus according to claim 6, wherein at least one of the first setting instruction or the second setting instruction is provided to the controller in response to a merchant or a customer setting a working mode of the acquiring apparatus.

8. The acquiring apparatus according to claim 5, wherein the same NFC module is configured to:

work as the first NFC module in a default state, and switch to work as the second NFC module in response to a switching signal of the controller; or work as the second NFC module in a default state, and switch to work as the first NFC module in response to a switching signal of the controller.

9. The acquiring apparatus according to claim 5, wherein the same NFC module is configured to:

work as the first NFC module, and send, by using the first radio frequency signal, a first request used to request to work in the card emulation mode to complete payment; and in response to receiving a confirmation response for the first request, switch to work as the second NFC module, and send the second response information.

10. The acquiring apparatus according to claim 9, wherein the same NFC module is further configured to:

in response to determining that the confirmation response is not received, send, by using the first radio frequency signal, a second request used to request to work in the card reader mode to complete payment.

11. The acquiring apparatus according to claim 9, wherein the first request comprises an application identifier of an application capable of interacting with the second NFC module to complete payment.

12. The acquiring apparatus according to claim 10, wherein:

the second request comprises a request used to request information about an available application capable of interacting with the first NFC module to complete payment; or the second request comprises an application identifier of an application capable of interacting with the first NFC module to complete payment.

13. The acquiring apparatus according to claim 5, wherein the same NFC module is configured to:

work as the first NFC module, and send, by using the first radio frequency signal, a second request used to request to work in the card reader mode to complete payment; and in response to receiving a confirmation response for the second request, obtain the customer information based on the confirmation response.

14. The acquiring apparatus according to claim 13, wherein the same NFC module is further configured to:

in response to determining that the confirmation response is not received, send, by using the first radio frequency signal, a first request used to request to work in the card emulation mode to complete payment.

15. The acquiring apparatus according to claim 5, wherein the same NFC module is configured to:

work as the first NFC module, and send, by using the first radio frequency signal, a second request used to request to work in the card reader mode to complete payment;

in response to determining, based on a confirmation response for the second request, that an interaction object is a specific digital wallet, send, by using the first radio frequency signal, a first request used to request to work in the card emulation mode to complete payment; and in response to receiving a confirmation response for the first request, switch to work as the second NFC module, and send the second response information.

16. The acquiring apparatus according to claim 5, wherein the acquiring apparatus further comprises a magnetic field sensor; and wherein the controller is configured to:

send a first control signal to the same NFC module in response to that an amplitude of a magnetic field strength change determined based on magnetic field data detected by the magnetic field sensor is less than a first threshold; and send a second control signal to the same NFC module in response to that the amplitude of the magnetic field strength change is greater than a second threshold; and the same NFC module is configured to:

work as the first NFC module in response to receiving the first control signal; and work as the second NFC module in response to receiving the second control signal.

17. The acquiring apparatus according to claim 5, wherein the same NFC module is configured to:

work as the first NFC module during a first time period of a first cycle; and work as the second NFC module during a second time period of the first cycle that is different from the first time period.

18. A control method for an acquiring apparatus, wherein the acquiring apparatus comprises a first NFC module and a second NFC module, and the control method comprises:

enabling, in a first condition, the first NFC module to work in a card reader mode to transmit a first radio frequency signal to a first device, detect first response information from the first device, and obtain customer information based on the first response information; and enabling, in a second condition, the second NFC module to work in a card emulation mode to sense a second radio frequency signal from a second device, and send second response information comprising merchant acquiring information in response to sensing the second radio frequency signal.

19. The method according to claim 18, wherein the first NFC module and the second NFC module are modules independent of each other, and both the first condition and the second condition are that an acquiring instruction is received.

20. The method according to claim 18, wherein the first NFC module and the second NFC module are implemented by a same NFC module, and either the first condition or the second condition is met; and when the first condition is met, the same NFC module is enabled to work as the first NFC module; and when the second condition is met, the same NFC module is enabled to work as the second NFC module.

21. The method according to claim 20, wherein:

the first condition is that a first setting instruction is received, and the second condition is that a second setting instruction is received; and at least one of the first setting instruction or the second setting instruction is provided to the acquiring apparatus in response to a merchant or a customer setting a working mode of the acquiring apparatus.

22. The method according to claim 20, wherein:

the enabling, in a first condition, the first NFC module to work in a card reader mode comprises:

in a default state, enabling the same NFC module to work as the first NFC module, and sending, by using the first radio frequency signal, a first request used to request to work in the card emulation mode to complete payment; and in response to determining that a confirmation response for the first request is not received, enabling the same NFC module to work as the first NFC module, and sending, by using the first radio frequency signal, a second request used to request to work in the card reader mode to complete payment; and the enabling, in a second condition, the second NFC module to work in a card emulation mode comprises:

in response to receiving the confirmation response, enabling the same NFC module to switch to work as the second NFC module, and sending the second response information.

23. The method according to claim 20, wherein:

the enabling, in a first condition, the first NFC module to work in a card reader mode comprises:

in a default state, enabling the same NFC module to work as the first NFC module, and sending, by using the first radio frequency signal, a second request used to request to work in the card reader mode to complete payment;

in response to receiving a confirmation response for the second request, enabling the same NFC module to work as the first NFC module, and obtaining the customer information based on the confirmation response; and in response to determining that the confirmation response is not received, enabling the same NFC module to work as the first NFC module, and send, by using the first radio frequency signal, a first request used to request to work in the card emulation mode to complete payment; and the enabling, in a second condition, the second NFC module to work in a card emulation mode comprises:

in response to receiving a confirmation response for the first request, enabling the same NFC module to switch to work as the second NFC module, and sending the second response information.

24. The method according to claim 20, wherein:

the enabling, in a first condition, the first NFC module to work in a card reader mode comprises:

in a default state, enabling the same NFC module to work as the first NFC module, and sending, by using the first radio frequency signal, a second request used to request to work in the card reader mode to complete payment; and in response to determining, based on a confirmation response for the second request, that an interaction object is a specific digital wallet, enabling the same NFC module to work as the first NFC module, and sending, by using the first radio frequency signal, a first request used to request to work in the card emulation mode to complete payment; and the enabling, in a second condition, the second NFC module to work in a card emulation mode comprises:

in response to receiving a confirmation response for the first request, enabling the same NFC module to switch to work as the second NFC module, and sending the second response information.

25. The method according to claim 20, wherein:

the first condition is that an amplitude of a magnetic field strength change around the acquiring apparatus is less than a first threshold; and the second condition is that the amplitude of the magnetic field strength change around the acquiring apparatus is greater than a second threshold.

26. The method according to claim 20, wherein the control method is cyclically performed based on a first cycle;

the first condition is a first time period of the first cycle; and the second condition is a second time period of the first cycle that is different from the first time period.

27. A computer program product, comprising a non-transitory computer readable medium storing computer instructions, wherein the computer instructions, when executed by at least one processor, cause the at least one processor to perform operations comprising:

enabling, in a first condition, a first NFC module to work in a card reader mode to transmit a first radio frequency signal to a first device, detect first response information from the first device, and obtain customer information based on the first response information, wherein an acquiring apparatus comprises the first NFC module and a second NFC module; and enabling, in a second condition, the second NFC module to work in a card emulation mode to sense a second radio frequency signal from a second device, and send second response information comprising merchant acquiring information in response to sensing the second radio frequency signal.

28. The computer program product according to claim 27, wherein the first NFC module and the second NFC module are modules independent of each other, and both the first condition and the second condition are that an acquiring instruction is received.

29. The computer program product according to claim 27, wherein the first NFC module and the second NFC module are implemented by a same NFC module, and either the first condition or the second condition is met; and when the first condition is met, the same NFC module is enabled to work as the first NFC module; and when the second condition is met, the same NFC module is enabled to work as the second NFC module.

30. The computer program product according to claim 29, wherein:

the first condition is that a first setting instruction is received, and the second condition is that a second setting instruction is received; and at least one of the first setting instruction or the second setting instruction is provided to the acquiring apparatus in response to a merchant or a customer setting a working mode of the acquiring apparatus.

* * * * *